US012615323B2

(12) United States Patent
Yueh

(10) Patent No.: US 12,615,323 B2
(45) Date of Patent: Apr. 28, 2026

(54) BACK COVER AND TERMINAL

(71) Applicant: Huawei Technologies Co., Ltd., Shenzhen (CN)

(72) Inventor: HanLin Yueh, Taipei (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 18/029,332

(22) PCT Filed: Sep. 9, 2021

(86) PCT No.: PCT/CN2021/117377
§ 371 (c)(1),
(2) Date: Mar. 29, 2023

(87) PCT Pub. No.: WO2022/068548
PCT Pub. Date: Apr. 7, 2022

(65) Prior Publication Data
US 2023/0370536 A1      Nov. 16, 2023

(30) Foreign Application Priority Data
Sep. 30, 2020      (CN) .......................... 202022224032.3

(51) Int. Cl.
*H04M 1/02*          (2006.01)
*H01Q 1/24*          (2006.01)
(52) U.S. Cl.
CPC ............ *H04M 1/026* (2013.01); *H01Q 1/243* (2013.01)
(58) Field of Classification Search
CPC ....... H04M 1/026; H01Q 1/243; H01Q 1/526; H01Q 15/0013
See application file for complete search history.

(56) References Cited

U.S. PATENT DOCUMENTS 6,670,932 B1      12/2003   Diaz et al.
7,420,524 B2 *     9/2008   Werner ................ H01Q 15/002
                                               343/909

(Continued)

FOREIGN PATENT DOCUMENTS

CN      109301489 A      2/2019
CN      109037934 B      1/2020

(Continued)

OTHER PUBLICATIONS

Dan Sievenpiper et al,"High-Impedance Electromagnetic Surfaces with a Forbidden Frequency Band",IEEE Transactions on Microwave Theory and Techniques, vol. 47, No. 11, Nov. 1999,total 16 pages.

(Continued)

*Primary Examiner* — Lunyi Lao
(74) *Attorney, Agent, or Firm* — Slater Matsil, LLP

(57)          ABSTRACT

A terminal includes a back cover and an antenna. The back cover includes a non-metallic plate body and a multi-frequency AMC structure. The multi-frequency AMC structure is attached to the inner surface of the non-metallic plate body, or the multi-frequency AMC structure is embedded into the non-metallic plate body. A middle part of the multi-frequency AMC structure has an opening, and the antenna is located on an inner side of the back cover and is disposed directly facing the opening. The multi-frequency AMC structure comprises a first AMC structure and a second AMC structure, a resonance frequency of the first AMC structure is a first resonance frequency, a resonance frequency of the second AMC structure is a second resonance frequency, and the first resonance frequency is lower than the second resonance frequency.

20 Claims, 30 Drawing Sheets

(56) References Cited

U.S. PATENT DOCUMENTS

| | | | | |
|---|---|---|---|---|
| 9,407,011 | B2 | 8/2016 | Zaghloul et al. | |
| 10,498,041 | B1 * | 12/2019 | Lin | H01Q 13/16 |
| 10,651,670 | B1 * | 5/2020 | Jiang | H02J 50/20 |
| 11,024,952 | B1 * | 6/2021 | Quarfoth | H01Q 1/364 |
| 2006/0044210 | A1 | 3/2006 | Ramprasad et al. | |
| 2009/0124294 | A1 | 5/2009 | Kim et al. | |
| 2016/0380335 | A1 * | 12/2016 | Jeong | H01Q 1/50 |
| | | | | 343/702 |
| 2017/0256867 | A1 * | 9/2017 | Ding | H01Q 15/14 |
| 2019/0098750 | A1 * | 3/2019 | Woo | H01Q 9/045 |
| 2019/0131713 | A1 * | 5/2019 | Luo | H01Q 15/16 |
| 2019/0166686 | A1 * | 5/2019 | Jo | H05K 1/0298 |
| 2020/0052416 | A1 * | 2/2020 | Yong | H01Q 21/08 |
| 2020/0358173 | A1 * | 11/2020 | Jong | H01Q 1/243 |
| 2021/0210857 | A1 * | 7/2021 | Sayama | H01Q 9/0457 |
| 2022/0013913 | A1 * | 1/2022 | Ikeda | H01Q 1/48 |
| 2024/0304982 | A1 * | 9/2024 | Wu | H01Q 1/50 |

FOREIGN PATENT DOCUMENTS

| | | |
|---|---|---|
| CN | 111406443 A | 7/2020 |
| CN | 213403085 U | 6/2021 |
| EP | 3691227 A1 | 8/2020 |
| WO | 2012162692 A2 | 11/2012 |

OTHER PUBLICATIONS

Hossein Mosallaei et al,"Antenna Miniaturization and Bandwidth Enhancement Using a Reactive Impedance Substrate", IEEE Transactions on Antennas and Propagation, vol. 52, No. 9, Sep. 2004,Sep. 3, 2004,total 12 pages.

Mehdi Hosseini et al,"Characteristics Estimation for Jerusalem Cross-Based Artificial Magnetic Conductors", IEEE Antennas and Wireless Propagation Letters, vol. 7, 2008, Apr. 4, 2008,total 4 pages.

Hui-Bin Zhang et al,"Resistance Selection of High Impedance Surface Absorbers for Perfect and Broadband Absorption", IEEE Transactions on Antennas and Propagation, vol. 61, No. 2, Feb. 2013, Dec. 31, 2012,total 4 pages.

Jiadong Lin, et al,"A Low-Profile Dual-Band Dual-Mode and Dual-Polarized Antenna Based on AMC", IEEE Antennas and Wireless Propagation Letters, vol. 16, 2017, Jul. 11, 2017,total 4 pages.

Teng Li et al,"A Dual-Band Metasurface Antenna Using Characteristic Mode Analysis", IEEE Transactions on Antennas and Propagation, vol. 66, No. 10, Oct. 2018, Jul. 26, 2018,total 5 pages.

Teng Li et al,"Design of Dual-Band Metasurface Antenna Array Using Characteristic Mode Analysis (CMA) for 5G Millimeter-Wave Applications", 2018 IEEE-APS Topical Conference on Antennas and Propagation in Wireless Communications (APWC),Oct. 25, 2018,total 4 pages.

Feng Han Lin et al,"Recent Progress in Metasurface Antennas Using Characteristic Mode Analysis", 13th European Conference on Antennas and Propagation (EuCAP 2019) ,Jun. 20, 2019 ,total 5 pages.

* cited by examiner 7A-1

7C-1

111
(First
AMC Structure
Unit)

15A-1    15A-2

112

Y
X 111
(First
AMC Structure
Unit)

15B-1    15B-2

112

111 —     (First AMC Structure Unit)     112

Y
X

BACK COVER AND TERMINAL

CROSS-REFERENCE TO RELATED APPLICATIONS

This application is a National Stage of International Application No. PCT/CN2021/117377, filed on Sep. 9, 2021, which claims priority to Chinese Patent Application No. 202022224032.3, filed on Sep. 30, 2020, both of which are hereby incorporated by reference in their entireties.

TECHNICAL FIELD

This application relates to the field of communication devices, and in particular, to a back cover and a terminal.

BACKGROUND

In a conventional terminal product, an antenna is placed under a back cover. When a radiation field of the antenna encounters the back cover, a surface wave is generated on the back cover. As a result, an energy loss of the radiation field is large and a radiation pattern is damaged, especially for an antenna operating in a millimeter-wave frequency band range, this energy loss is more obvious, and consequently, receiving and sending performance of the antenna is damaged.

SUMMARY

An objective of this application is to provide a back cover and a terminal. A multi-frequency AMC (artificial magnetic conductor, artificial magnetic conductor) structure is disposed on an inner side surface of the back cover, and is configured to block propagation of an electromagnetic wave on the back cover, to improve a radiation pattern and receiving and sending performance of the antenna.

According to a first aspect, this application provides a back cover, applied to a terminal. The terminal includes the back cover and an antenna. The back cover includes a non-metallic plate body and a multi-frequency AMC structure. The multi-frequency AMC structure is fastened to an inner surface of the non-metallic plate body, a middle part of the multi-frequency AMC structure has an opening, the opening is configured to allow an electromagnetic wave signal to pass through the back cover in a direction perpendicular to the non-metallic plate body, and the multi-frequency AMC structure is configured to block propagation of an electromagnetic wave on the non-metallic plate body.

The multi-frequency AMC structure is fastened to the non-metallic plate body. Because a radiation field of the antenna induces and generates a surface wave on the non-metallic plate body in a propagation process, the multi-frequency AMC structure is disposed on the inner surface of the non-metallic plate body, to prevent propagation of the surface wave on the non-metallic plate body. On this basis, the opening is further disposed in the middle part of the multi-frequency AMC structure. In this way, propagation of the radiation field of the antenna in a direction perpendicular to the non-metallic plate body is not limited, and propagation of the surface wave on the non-metallic plate body can be prevented. This reduces an energy loss of the radiation field, improves a radiation pattern, and improves receiving and sending performance of the antenna. In addition, a high-impedance surface formed by the multi-frequency AMC structure has a characteristic that a reflection phase coefficient is positive, so that a concentration capability of the radiation pattern of the antenna can be improved.

In a possible implementation, the multi-frequency AMC structure has at least two resonance frequencies, and the resonance frequencies of the multi-frequency AMC structure at least partially overlap with an operating frequency band of the antenna. The multi-frequency AMC structure has at least two resonance frequencies, and can meet diversified use requirements.

In a possible implementation, the multi-frequency AMC structure includes a plurality of structure units, the structure units include a first AMC structure unit and a second AMC structure unit, a resonance frequency of the first AMC structure unit is a first resonance frequency, a resonance frequency of the second AMC structure unit is a second resonance frequency, and the first resonance frequency is lower than the second resonance frequency. The multi-frequency AMC structure includes two types of structure units. Therefore, a resonance frequency range of the multi-frequency AMC structure may be adjusted by adjusting the resonance frequency of the first AMC structure unit and/or the second AMC structure unit. In this way, adjusting and controlling the resonance frequency is easier, which can match different operating frequencies of the antenna, meet increasingly diversified requirements of a consumer, and easily integrate with the antenna into a terminal product.

In a possible implementation, the plurality of structure units are periodically arranged, each of the structure units is a centrosymmetric structure, symmetric centers of the plurality of structure units are aligned along a first direction and aligned along a second direction, and the second direction is perpendicular to the first direction. That the plurality of structure units are aligned can reduce difficulty of fabricating the multi-frequency AMC structure and improve production efficiency.

In a possible implementation, there is a spacing between the first AMC structure unit and the second AMC structure unit in the first direction, and there is also a spacing between the first AMC structure unit and the second AMC structure unit in the second direction, where the spacing in the second direction is equal to the spacing in the first direction. In this uniform arrangement manner, the multi-frequency AMC structure has uniform impact on the radiation field of the antenna, to avoid adverse impact on the electromagnetic wave in a specific radiation direction and further avoid affecting the radiation pattern of the antenna.

In a possible implementation, the first AMC structure unit and the second AMC structure unit are arranged in a staggered manner, and in the first direction and the second direction, a structure unit adjacent to each of first AMC structure units is the second AMC structure unit, and a structure unit adjacent to each of second AMC structure units is the first AMC structure unit. The plurality of structure units are arranged one by one at a same spacing in a staggered manner. Further, in this uniform arrangement manner, the multi-frequency AMC structure has consistent impact on the radiation field of the antenna in a range of the multi-frequency AMC structure, to avoid adverse impact on the electromagnetic wave in a specific radiation direction and further affect the radiation pattern of the antenna.

In a possible implementation, the first AMC structure unit includes an internal patch and an external frame-shaped patch, the external frame-shaped patch is disposed around the internal patch, and a gap exists between the internal patch and the external frame-shaped patch. The resonance frequency of the first AMC structure unit is determined by a coupling amount between the internal patch and the external frame-shaped patch, and the coupling amount is related to the gap between the internal patch and the external frame-shaped patch. In addition, a smaller gap S indicates a lower resonance frequency. Therefore, the resonance frequency of the first AMC structure unit may be adjusted by controlling a size of the gap between the internal patch and the external frame-shaped patch.

In a possible implementation, the gap is in a range of 0.005 times to 0.04 times a first wavelength, and the first wavelength is an equivalent dielectric wavelength corresponding to the first resonance frequency, so that the resonance frequency of the first AMC structure unit is in a frequency range of a millimeter wave.

In a possible implementation, a side size of the external frame-shaped patch is in a range of 0.15 times to 0.4 times a first wavelength, the first wavelength is an equivalent dielectric wavelength corresponding to the first resonance frequency, a side size of the internal patch is in a range of 0.1 times to 0.3 times the first wavelength. A frequency of the first AMC structure unit is related to sizes of the external frame-shaped patch and the internal patch, and different resonance frequencies may be obtained by adjusting the sizes.

In a possible implementation, the internal patch of the first AMC structure unit is a square patch, and the external frame-shaped patch of the first AMC structure unit is a frame-shaped patch. In this way, the multi-frequency AMC structure matches a shape of a housing, and is easy to design, process, and manufacture.

In a possible implementation, the second AMC structure unit includes a first linear patch and a second linear patch, and the first linear patch and the second linear patch are arranged in a cross manner and perpendicular to each other. The first linear patch and the second linear patch are perpendicular to each other, to form cross polarization and reduce a coupling amount between the first linear patch and the second linear patch and the first AMC structure unit.

In a possible implementation, the first linear patch is in a straight line shape, and the second linear patch is in a straight line shape. The first linear patch and the second linear patch are in the straight line shape, and are easy to process and manufacture, to improve production efficiency.

In a possible implementation, the first linear patch includes one or more protrusions, and the second linear patch includes one or more protrusions. The resonance frequency of the second AMC structure unit may be adjusted by controlling actual lengths of the first linear patch and the second linear patch of the second AMC structure unit. Actual lengths of the first linear patch and the second linear patch may be changed by increasing or decreasing quantities of protrusions and/or shapes and sizes of the protrusions of the first linear patch and the second linear patch, to adjust the resonance frequency of the second AMC structure unit.

In a possible implementation, the actual lengths of the first linear patch and the second linear patch are in 0.3 times to 1 time an equivalent dielectric wavelength corresponding to the first resonance frequency, so that the resonance frequency of the second AMC structure unit is in a frequency range of a millimeter wave.

In a possible implementation, the first AMC structure unit includes a first internal patch and a first external frame-shaped patch, the first external frame-shaped patch is disposed around the first internal patch, a first gap exists between the first internal patch and the first external frame-shaped patch, the second AMC structure unit includes a second internal patch and a second external frame-shaped patch, the second external frame-shaped patch is disposed around the second internal patch, a second gap exists between the second internal patch and the second external frame-shaped patch, and the first gap is less than the second gap. Both the first AMC structure unit and the second AMC structure unit use a DSR structure. Resonance of the first AMC structure unit of such a multi-frequency AMC structure is likely affected by the second AMC structure unit, so that a response frequency bandwidth of the first AMC structure unit is compressed.

In a possible implementation, the first AMC structure unit includes an internal patch and an external frame-shaped patch, the external frame-shaped patch is disposed around the internal patch, a gap exists between the internal patch and the external frame-shaped patch, each side of the internal patch is disposed in parallel with a corresponding side of the external frame-shaped patch, an included angle is formed between each side of the internal patch and the first direction, and the included angle is in a range of 0° to 90°.

In a possible implementation, the second AMC structure unit includes a first linear patch and a second linear patch, the first linear patch and the second linear patch are arranged in a cross manner and perpendicular to each other, an included angle is formed between an extension direction of the first linear patch and the first direction, and the included angle is in a range of 0° to 90°.

In a possible implementation, the first AMC structure unit is a ✢ shaped gap formed on a square patch; or the first AMC structure unit is a ⊞ shaped gap formed on a square patch; or the second AMC structure unit is a ✢ shaped patch.

In a possible implementation, the first AMC structure unit includes an internal patch and an external frame-shaped patch, the external frame-shaped patch is disposed around the internal patch, a gap exists between the internal patch and the external frame-shaped patch, the second AMC structure unit includes a plurality of ✢ shaped patches, and the first AMC structure unit and the second AMC structure unit are coupled to generate a third resonance frequency. The foregoing plurality of multi-frequency AMC structures may be used to prevent a surface wave from being propagated on the back cover, and improve the radiation pattern of the antenna.

In a possible implementation, a dielectric constant of the non-metallic plate body is in a range of 2 to 10, a dielectric loss parameter of the non-metallic plate body is less than 0.03, and a thickness of the non-metallic plate body is in a range of 0.3 mm to 1.4 mm. A main structure of the back cover of the terminal is the non-metallic plate body, so that reduction of radiation energy of the antenna can be effectively reduced. It may be understood that, for an antenna operating in a millimeter-wave band range, because a wavelength of the antenna is in a range of 1 mm to 10 mm, a diffraction capability of the antenna is weak, and a capability of bypassing an object is poor, the antenna is more likely to being blocked by a component such as a back cover, and a radiation pattern of the antenna is damaged. In addition, because a radiation field frequency of the millimeter-wave antenna is high, a shielding effect of metal on the radiation field of the millimeter-wave antenna is more obvious, and using the metal significantly reduces energy of the radiation field of the millimeter-wave antenna. Therefore, using a non-metallic plate body made of a non-metal material as a main structure of the back cover can effectively avoid weakening of the energy of the radiation field of the antenna, and improve receiving and sending performance of the antenna.

According to a second aspect, this application provides a terminal, including an antenna and a back cover. The antenna is located on an inner side of the back cover, and the antenna is disposed directly facing an opening of a multi-frequency AMC structure of the back cover. In other words, a projection of the antenna on the back cover is in a range of the opening, and the antenna is located right below the opening. In this embodiment, the multi-frequency AMC structure is fastened to a non-metallic plate body. Because a radiation field of the antenna induces and generates a surface wave on the non-metallic plate body in a propagation process, the multi-frequency AMC structure is disposed on an inner surface of the non-metallic plate body, to prevent propagation of the surface wave on the non-metallic plate body. On this basis, the opening is further disposed in a middle part of the multi-frequency AMC structure. In this way, propagation of the radiation field of the antenna in a direction perpendicular to the non-metallic plate body is not limited, and propagation of the surface wave on the non-metallic plate body can be prevented. This reduces an energy loss of the radiation field, improves a radiation pattern, and improves receiving and sending performance of the antenna. In addition, a high-impedance surface formed by the multi-frequency AMC structure has a characteristic that a reflection phase coefficient is positive, so that a concentration capability of the radiation pattern of the antenna can be improved.

In a possible implementation, the terminal further includes a ground component, The ground component is located on an inner side of the back cover, and the antenna is fastened to a side that is of the ground component and that faces the back cover. The ground component is configured to reflect an electromagnetic wave that is transmitted by the antenna and that faces a direction of the ground component, to avoid electromagnetic interference to an electronic component or a module disposed on a side that is of the ground component and that is away from the antenna.

In a possible implementation, in a plane parallel to an inner surface of the multi-frequency AMC structure, there is a distance between the antenna and the multi-frequency AMC structure in a first direction and a second direction, and the distance is in a range of 0 times to 0.7 times a first wavelength, where the first wavelength is an equivalent dielectric wavelength corresponding to a first resonance frequency. There is a specific distance between the multi-frequency AMC structure and the antenna, so that the propagation of the surface wave on the back cover can be effectively prevented, and specific space is reserved for the propagation of the radiation field of the antenna in the direction perpendicular to the non-metallic plate body, to avoid impact on receiving and sending performance of the antenna.

In a possible implementation, an operating frequency band range of the antenna is n257+n258, n257+n260, n258+n260, or n257+n258+n260. In other words, the antenna operates in a millimeter-wave band range, and can meet a technical requirement in the rapidly developing communication field.

DETAILED DESCRIPTION OF ILLUSTRATIVE EMBODIMENTS

The following describes embodiments of this application with reference to the accompanying drawings in embodiments of this application.

Figure 1:
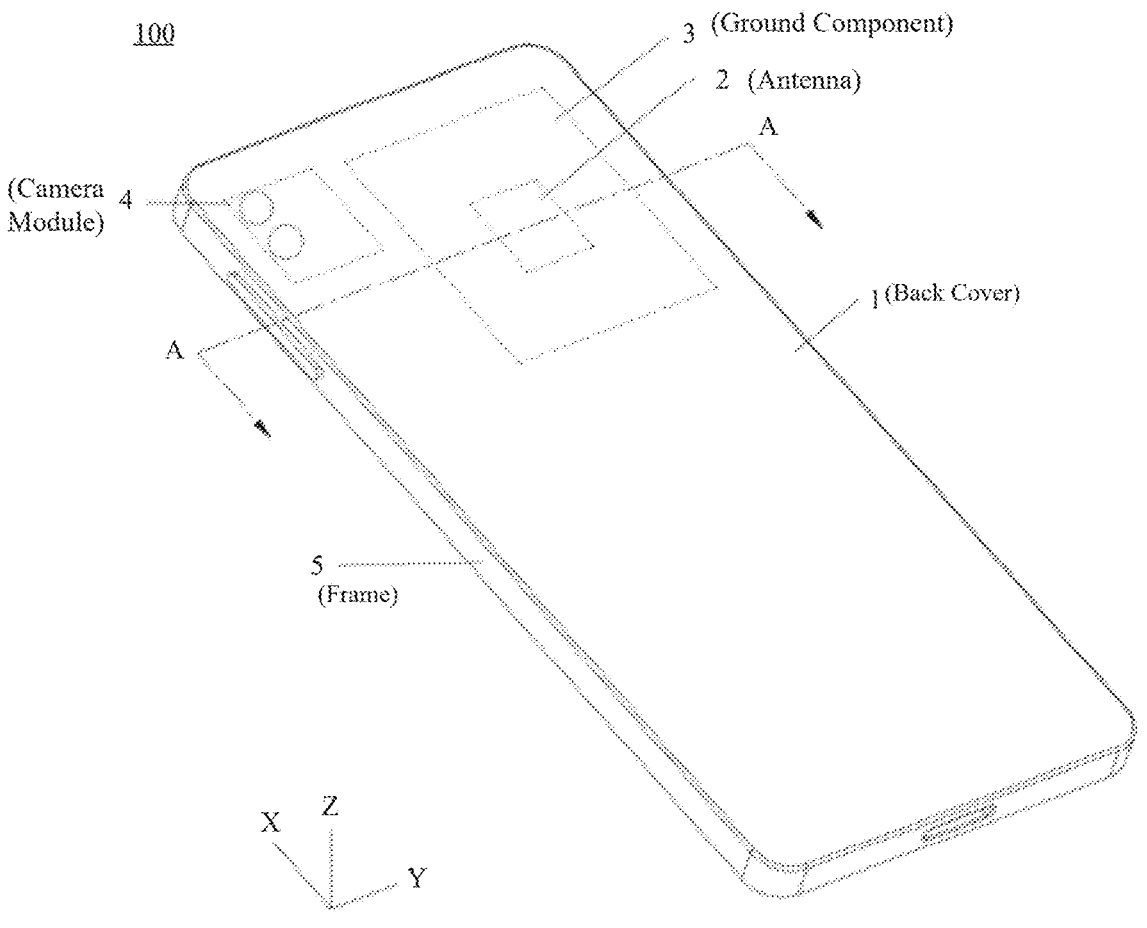
FIG. 1 is a schematic diagram of a structure of a terminal in some embodiments according to this application.

FIG. 1 is a schematic diagram of a structure of a terminal 100 in some embodiments according to this application. The terminal 100 may be an electronic product such as a mobile phone, a tablet computer, a notebook computer, a wearable device, a point of sales terminal (point of sales terminal, POS machine for short), or a router. In this embodiment of this application, an example in which the terminal 100 is the mobile phone is used for description.

In some embodiments, the terminal 100 includes a back cover 1, an antenna 2, a ground component 3, a camera module 4, a frame 5, and a display (not shown in the figure). The display and the back cover 1 are fixed back to back on two sides of the frame 5, and the display, the back cover 1, and the frame 5 jointly enclose an inner cavity of an entire machine of the terminal 100. The display is configured to display an image, and the display may further integrate a touch control function. Both the antenna 2 and the ground component 3 are accommodated in the inner cavity of the entire machine, the antenna 2 is fastened to the ground component 3, and the antenna 2 is electrically connected to the ground component 3 to implement grounding. The antenna 2 is located between the back cover 1 and the ground component 3, and the antenna 2 is disposed close to the back cover 1. The antenna 2 is configured to receive and transmit an electromagnetic wave, to transmit a signal. The electromagnetic wave is emitted by the antenna 2, and radiates outwards through the back cover 1. In addition, an electromagnetic wave from outside of the terminal 100 passes through the back cover 1 and can be received by the antenna 2. The ground component 3 is configured to reflect an electromagnetic wave that is transmitted by the antenna 2 and that faces a direction of the ground component 3, to avoid electromagnetic interference to an electronic component or a module disposed on a side that is of the ground component 3 and that is away from the antenna 2. The ground component 3 may be of a circuit board structure. The camera module 4 is accommodated in the inner cavity of the entire machine, and the camera module 4 may collect external light by using a camera on the back cover 1, to implement photographing.

In some embodiments, the antenna 2 is disposed on the top of the terminal 100, and is not interfered with by another electronic component in the terminal, for example, a battery, to prevent performance of receiving and transmitting an electromagnetic wave by the antenna 2 from being damaged. In some other embodiments, the antenna 2 may alternatively be disposed at the bottom of the terminal 100, that is, an end far away from the camera module 4. In some other embodiments, the antenna 2 may alternatively be disposed in a middle part of the terminal. It may be understood that a position of the antenna 2 in the terminal may be adjusted based on a position of another element in the terminal. This is not strictly limited in this embodiment of this application.

For ease of description below, in FIG. 1, a direction of a long side of the back cover 1 is defined as a first direction X, a direction of a short side of the back cover 1 is defined as a second direction Y, and a direction perpendicular to an XY plane is defined as a third direction Z. It may be understood that, in some other embodiments, the first direction, the second direction, and the third direction may alternatively have other orientations, provided that a position relationship between the first direction, the second direction, and the third direction is met. For example, a size of the back cover 1 in the first direction X is 150 mm, a size of the back cover 1 in the second direction Y is 70 mm, a size of the back cover 1 in the third direction Z is 0.5 mm, a size of the ground component 3 in the first direction X is 150 mm, and a size of the ground component 3 in the second direction Y is 70 mm. It may be understood that the size of the back cover 1 and the size of the ground component 3 may be changed based on a design requirement of the terminal 100. This is not strictly limited in this embodiment of this application.

Figure 2:
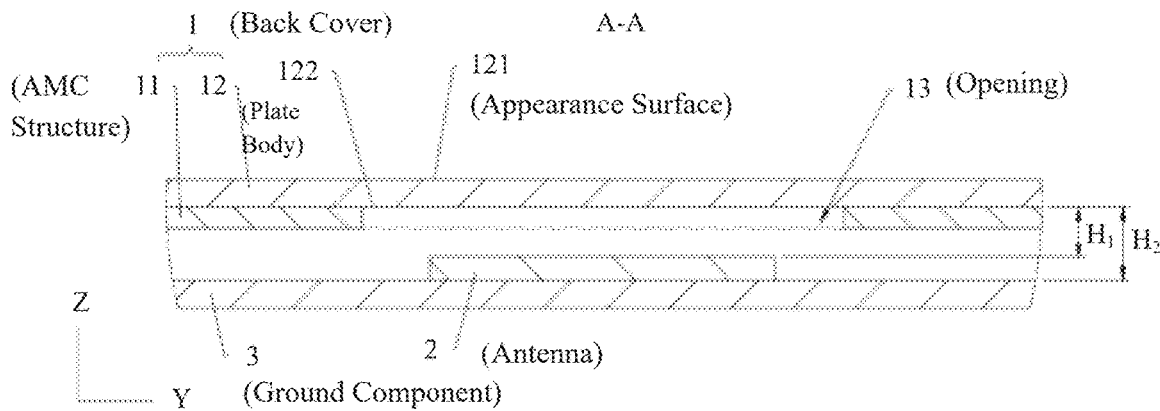
FIG. 2 is a schematic sectional view of a partial structure of a terminal shown in FIG. 1 that is cut along a line A-A.

In some embodiments, FIG. 2 is a schematic sectional view of a partial structure of the terminal 100 shown in FIG. 1 that is cut along a line A-A. FIG. 2 shows the back cover 1, the antenna 2, and the ground component 3 of the terminal 100. The antenna 2 and the ground component 3 are located below the back cover 1.

The back cover 1 includes a non-metallic plate body 12 and a multi-frequency AMC (artificial magnetic conductor, artificial magnetic conductor) structure 11. The multi-frequency AMC structure 11 is fastened to an inner surface 122 of the non-metallic plate body 12. The non-metallic plate body 12 further includes an appearance surface 121 disposed opposite to the inner surface 122, and the appearance surface 121 is a surface facing the outside of the terminal 100. An opening 13 is disposed in the middle part of the multi-frequency AMC structure 11, and the antenna 2 is located right below the opening 13. The opening 13 is configured to allow an electromagnetic wave signal to pass through the back cover 1 in a direction perpendicular to the non-metallic plate body 12. The multi-frequency AMC structure 11 is configured to block propagation of an electromagnetic wave on the non-metallic plate body 12, that is, prevent a surface wave from spreading and propagating on the back cover 1.

In some embodiments, a dielectric constant of the non-metallic plate body 12 is in a range of 2 to 10, a dielectric loss parameter of the non-metallic plate body 12 is less than 0.03, and a thickness of the non-metallic plate body 12 is in a range of 0.3 mm to 1.4 mm. A main structure of the back cover 1 of the terminal 100 is the non-metallic plate body 12, which can avoid weakening of energy of a radiation field of the antenna 2. It may be understood that, for the antenna 2 operating in a millimeter-wave band range, because a wavelength of the antenna 2 is in a range of 1 mm to 10 mm, a diffraction capability of the millimeter wave is weak, and a capability of bypassing an object is poor, the antenna 2 is more likely to being blocked by a component such as the back cover 1, and a radiation pattern of the antenna 2 is damaged. In addition, because a radiation field frequency of the millimeter-wave antenna 2 is high, a shielding effect of metal on the radiation field of the millimeter-wave antenna 2 is more obvious, and using the metal significantly reduces energy of the radiation field of the millimeter-wave antenna 2. Therefore, using the non-metallic plate body 12 made of a non-metallic material as the main structure of the back cover 1 can effectively avoid weakening of the energy of the radiation field of the antenna 2, and improve receiving and sending performance of the antenna 2.

In some embodiments, the multi-frequency AMC structure 11 is attached to the inner surface 122 of the non-metallic plate body 12, or the multi-frequency AMC structure 11 is embedded into the non-metallic plate body 12 from the inner surface 122 of the non-metallic plate body 12. For example, the multi-frequency AMC structure 11 may be implemented by using a flexible circuit board patch structure, and the multi-frequency AMC structure 11 is bonded to the inner surface 122 of the non-metallic plate body 12. Alternatively, the multi-frequency AMC structure 11 is directly formed on the inner surface 122 of the non-metallic plate body 12 through slurry coating, screen printing, or the like. A material of the multi-frequency AMC structure 11 may be a metallic and/or non-metallic conductive material. This is not strictly limited in this embodiment of this application. It may be understood that the multi-frequency AMC structure 11 is fastened to the inner surface 122 of the non-metallic plate body 12, and an adverse impact of the surface wave on the radiation pattern can be reduced without occupying additional circuit board space. In this way, integration of the multi-frequency AMC structure 11 and the antenna 2 is high, and more internal space of the terminal 100 is released, so that a structure of the entire terminal 100 is more compact, space is also provided for arrangement of another element, and performance of the terminal 100 can be improved by adding an element.

For example, the antenna 2 may operate in a range of frequency bands n257 (26.5 GHz to 29.5 GHz) and n258 (24.25 GHz to 27.5 GHz), that is, 24.25 GHz to 29.5 GHz, which belongs to a millimeter-wave band. In some other embodiments, an operating frequency band range of the antenna 2 may alternatively be n257+n260 (37 GHz to 40 GHz), n258+n260, n257+n258+n260, or another frequency band. This is not strictly limited in this embodiment of this application.

In some embodiments, the antenna 2 may be an antenna array formed by using antennas that complement radiation beams, for example, an antenna array formed by using a broadside radiation (broadside radiation) antenna and an end-fire (end-fire radiation) antenna, and the broadside radiation (broadside radiation) antenna of the antenna 2 is placed below the opening 13 in a center of the multi-frequency AMC structure 11. It may be understood that, to implement wider space coverage, a millimeter-wave antenna array uses a type of antenna that complements radiation beams, and is designed based on an antenna feedpoint, to achieve dual-polarized (vertical polarization and horizontal polarization) coverage, to greatly improve a range and a coverage rate of a millimeter-wave signal. In some other embodiments, the antenna 2 may alternatively use another type of antenna for collocation design, or use one type of antenna. This is not strictly limited in this embodiment of this application. In some other embodiments, both the broadside radiation antenna and the end-fire radiation antenna of the antenna 2 may be located below the opening 13 in the middle part of the multi-frequency AMC structure 11.

For example, the antenna 2 may be a packaged antenna. The antenna 2 operates in the millimeter-wave band, and a size of the antenna 2 falls within a millimeter level. An antenna design is usually implemented by using an AiP (antenna in package, that is, an antenna array is packaged in a chip) manufacturing technology. In some other embodiments, manufacturing manners such as AoB (antenna on board, that is, an antenna array is disposed on a substrate), AiM (antenna in module, that is, an antenna array and a radio frequency integrated circuit (radio frequency integrated circuits, RFICs) form a module) may also be used. Alternatively, the antenna 2 may be a planar antenna, and the antenna 2 is configured to receive and transmit an electromagnetic wave signal. This is not strictly limited in this embodiment of this application.

As shown in FIG. 2, a distance H1 is disposed between the non-metallic plate body 12 and the antenna 2 in the third direction Z. For example, the distance H1 is 0.25 mm. In some other embodiments, a size of the distance H1 is in a range of 0.2 mm to 1 mm. A distance H2 is disposed between the non-metallic plate body 12 and the ground component 3 in the third direction Z. For example, the distance H2 is 0.9 mm. In some other embodiments, a size of the distance H2 is a sum of heights of the H1 and the antenna 2 in the third direction Z. In this embodiment of this application, the AMC structure is used as a reflection panel that prevents the propagation of the surface wave, and a distance between the multi-frequency AMC structure 11 and the antenna 2 can be effectively reduced by using an in-phase reflection characteristic of the AMC structure, to further reduce internal space of the terminal 100.

Figure 3:
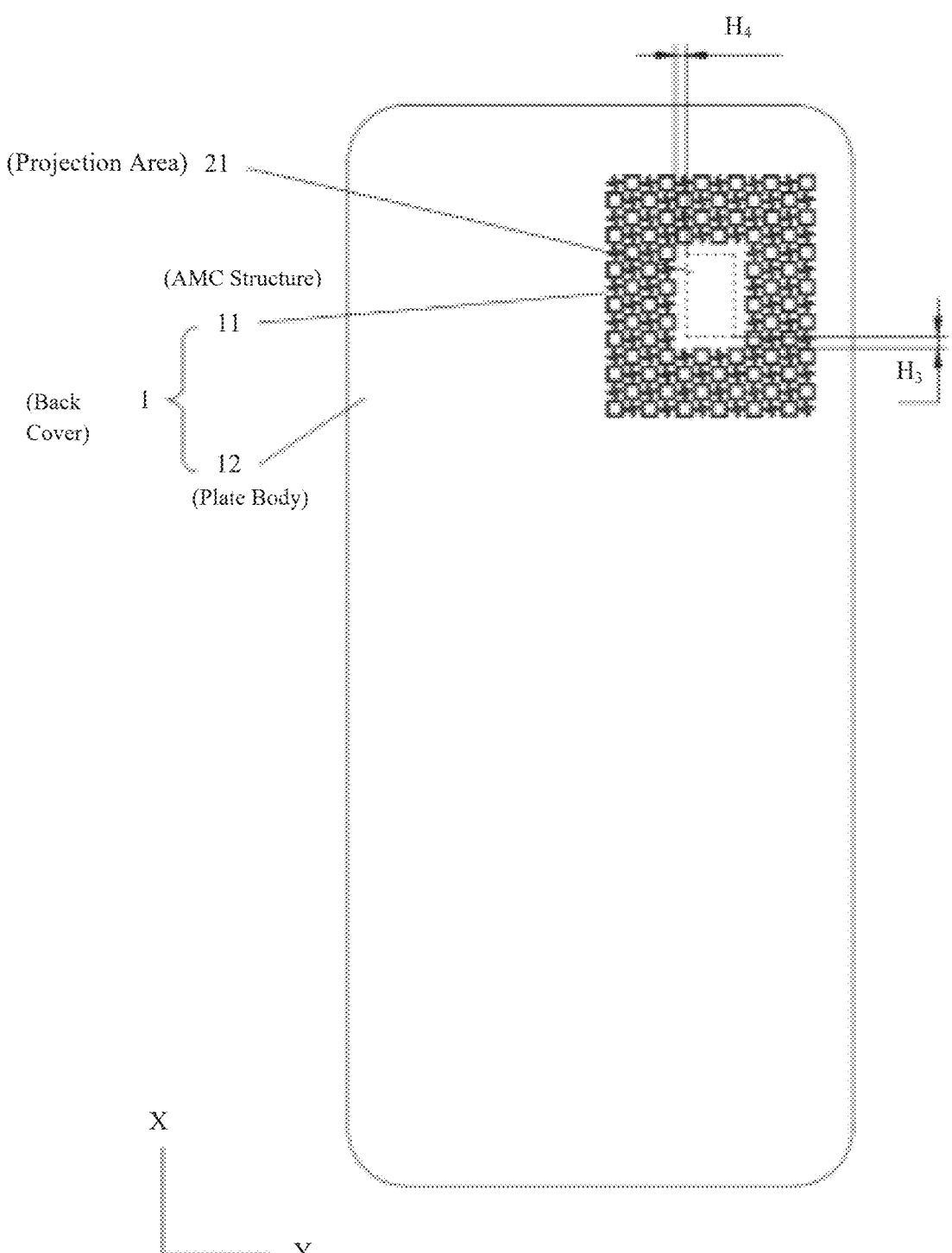
FIG. 3 is a schematic diagram of a structure of a back cover shown in FIG. 1.

FIG. 3 is a schematic diagram of a structure of the back cover 1 shown in FIG. 1. Refer to FIG. 1. The antenna 2 can form a projection area 21 on the back cover 1. The multi-frequency AMC structure 11 and the projection area 21 are respectively provided with a gap H3 and a gap H4 in the first direction X and the second direction Y. A specific distance exists between the multi-frequency AMC structure 11 and the antenna 2, which can effectively prevent the propagation of the surface wave on the non-metallic plate body 12, and can reserve specific space for the propagation of the radiation field of the antenna 2 in a propagation direction away from the non-metallic plate body 12, to avoid affecting receiving and sending performance of the antenna 2.

In a conventional terminal, an antenna of the terminal is placed under a back cover. When a radiation field of the antenna encounters the back cover, a surface wave is generated on the back cover. As a result, an energy loss of the radiation field is large and a radiation pattern is damaged, especially for an antenna operating in a millimeter-wave frequency band range, this energy loss is more obvious, and consequently, receiving and sending performance of the antenna is damaged.

In this embodiment, the multi-frequency AMC structure 11 is fastened to the non-metallic plate body 12. Because the radiation field of the antenna 2 induces and generates a surface wave on the non-metallic plate body 12 in a propagation process, the multi-frequency AMC structure 11 is disposed on the inner surface 122 of the non-metallic plate body 12, to prevent propagation of the surface wave on the non-metallic plate body 12. On this basis, the opening 13 is further disposed in the middle part of the multi-frequency AMC structure 11. In this way, propagation of the radiation field of the antenna 2 in the direction perpendicular to the non-metallic plate body 12 is not limited, and the propagation of the surface wave on the non-metallic plate body 12 can be prevented. This reduces an energy loss of the radiation field, improves a radiation pattern, and improves receiving and sending performance of the antenna 2. In addition, a high-impedance surface formed by the multi-frequency AMC structure 11 has a characteristic that a reflection phase coefficient is positive, so that a concentration capability of the radiation pattern of the antenna 2 can be improved.

Figure 4:
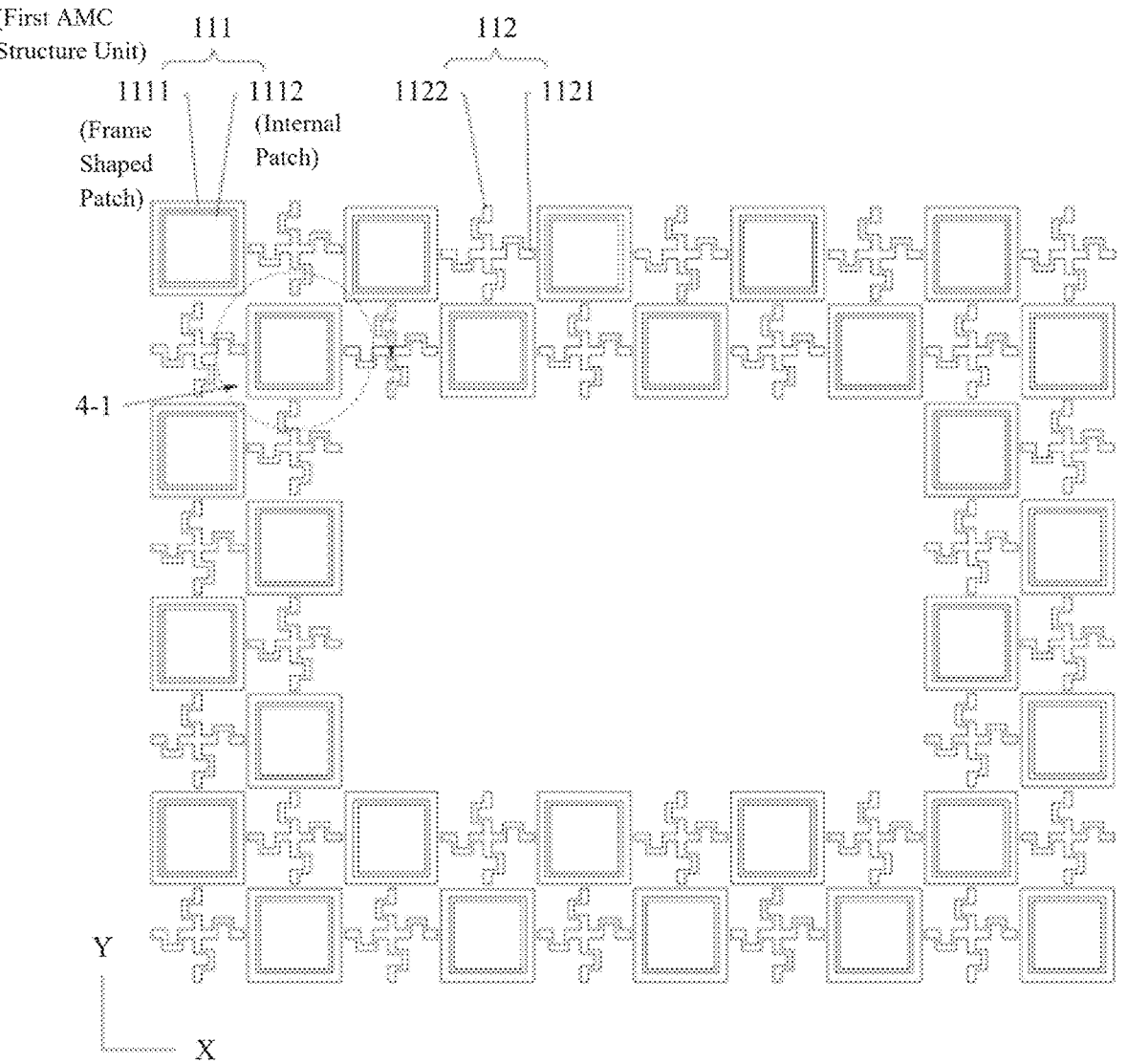
FIG. 4 is a schematic diagram of an implementation of a multi-frequency AMC structure shown in FIG. 3.

FIG. 4 is a schematic diagram of an implementation of the multi-frequency AMC structure 11 shown in FIG. 3. The multi-frequency AMC structure 11 includes a plurality of structure units, where the plurality of structure units are arranged periodically. Each structure unit is a centrosymmetric structure, and symmetrical centers of the plurality of structure units are aligned along the first direction X and the second direction Y. The plurality of structure units are aligned and arranged, so that manufacturing difficulty of the multi-frequency AMC structure 11 can be reduced, and production efficiency can be improved. The structure unit includes a first AMC structure unit 111 and a second AMC structure unit 112. A resonance frequency of the first AMC structure unit 111 is a first resonance frequency, a resonance frequency of the second AMC structure unit 112 is a second resonance frequency, and the first resonance frequency is lower than the second resonance frequency.

For example, the structure units of the multi-frequency AMC structure 11 have the first resonance frequency and the second resonance frequency. In some other embodiments, the multi-frequency AMC structure 11 has at least two resonance frequencies, and a plurality of resonance frequencies at least partially overlap an operating frequency band of the antenna. The setting can meet diversified use requirements, and an application scope is wider.

In some embodiments, refer to FIG. 3. The multi-frequency AMC structure 11 and the projection area 21 of the antenna 2 are respectively provided with the gap H3 and the gap H4 in the first direction X and the second direction Y, and sizes of the H3 and the H4 are in a range of 0 times to 0.7 times an equivalent dielectric wavelength corresponding to the first resonance frequency.

The equivalent dielectric wavelength $\lambda_{eq}$ is related to an equivalent dielectric coefficient $\varepsilon_{eq}$. A corresponding relationship between the equivalent dielectric wavelength $\lambda_{eq}$ and the equivalent dielectric coefficient $\varepsilon_{eq}$ is as follows:

$$\lambda_{eq} = \frac{\lambda_0}{\sqrt{\varepsilon_{eq}}},$$

where $\lambda_0$ is a wavelength of an electromagnetic wave in a vacuum.

In some embodiments, a plurality of first AMC structure units 111 and a plurality of second AMC structure units 112 are arranged one by one in a staggered manner, that is, in the first direction X and the second direction Y, a structure unit adjacent to each of the first AMC structure units 111 is the second AMC structure unit 112, and a structure unit adjacent to each of the second AMC structure units 112 is the first AMC structure unit 111. In some other embodiments, the plurality of first AMC structure units 111 and the plurality of second AMC structure units 112 may also be arranged in another staggered manner. The plurality of first AMC structure units 111 and the plurality of second AMC structure units 112 are arranged one by one in a staggered manner. In this uniform arrangement manner, the multi-frequency AMC structure 11 has uniform impact on the radiation field of the antenna, to avoid adverse impact on an electromagnetic wave in a specific radiation direction and further avoid affecting the radiation pattern of the antenna 2.

The equivalent dielectric coefficient $\varepsilon_{eq}$ is related to a dielectric thickness $t_n$ of each layer and a dielectric constant $\varepsilon_n$ of each layer. A corresponding relationship among the equivalent dielectric coefficient $\varepsilon_{eq}$, the dielectric thickness $t_n$ of each layer, and the dielectric constant $\varepsilon_n$ of each layer is as follows:

$$\varepsilon_{eq} = \left( \sum_{n=1}^{N} \frac{t_n}{\varepsilon_n} \right)^{-1} \cdot \left( \sum_{n=1}^{N} t_n \right).$$

For example, when the thickness of the non-metallic plate body 12 is 0.5 mm, the dielectric coefficient $\varepsilon_{Glass}$ of the non-metallic plate body 12 is 6.6, the distance $H_2$ between the non-metallic plate body 12 and the ground component 3 in the third direction Z is 0.9 mm, a thickness of air between the non-metallic plate body 12 and the ground component 3 is 0.9 mm, and a dielectric coefficient $\varepsilon_0$ of the air is 1. The foregoing specific values are substituted into the formula of the equivalent dielectric coefficient $\varepsilon_{eq}$, and it may be obtained that a value of the equivalent dielectric coefficient $\varepsilon_{eq}$ is 1.36.

A specific calculation process is as follows:

$$\varepsilon_{eq} = \left( \frac{0.9}{1} + \frac{0.5}{6.6} \right)^{-1} \cdot (0.9 + 0.5) = 1.36.$$

In this embodiment, the multi-frequency AMC structure 11 includes two types of structure units. Therefore, a resonance frequency range of the multi-frequency AMC structure 11 may be adjusted by adjusting the resonance frequency of the first AMC structure unit 111 and/or the second AMC structure unit 112. In this way, adjusting and controlling the resonance frequency is easier, which can match different operating frequencies of the antenna, and meet increasingly diversified requirements of a consumer.

In some embodiments, the first AMC structure unit 111 includes an internal patch 1112 and an external frame-shaped patch 1111, and the external frame-shaped patch 1111 is disposed around the internal patch 1112, that is, the first AMC structure unit 111 is a dual square ring (dual square ring, DSR) structure, and is configured to implement the first resonance frequency, which is lower than the second resonance frequency. The external frame-shaped patch 1111 in the DSR structure extends a current path, so that a resonance frequency of the DSR structure is low. The second AMC structure unit 112 includes a first linear patch 1121 and a second linear patch 1122, and the first linear patch 1121 and the second linear patch 1122 are arranged in a cross manner and perpendicular to each other. The second AMC structure unit 112 is a cross (cross) structure, and the cross structure is used to implement the second resonance frequency.

In some embodiments, refer to a part circled in 4-1 in FIG. 4. Four sides of the external frame-shaped patch 1111 of the first AMC structure unit 111 are adjacent to a linear patch (the first linear patch 1121 or the second linear patch 1122) of the second AMC structure unit 112, and four sides of the external frame-shaped patch 1111 are perpendicular to extension directions of four adjacent linear patches. When a shape of a linear patch is a straight line, an extension direction is a direction of the straight line on which the linear patch is located. When a shape of the linear patch is a curve, an extension direction is a direction from a midpoint of a short side at one end of the linear patch to a midpoint of a short side at the other end of the linear patch. In this way, cross polarization is formed between the first AMC structure unit 111 and an adjacent second AMC structure unit 112, and a cross polarization direction is characterized by low energy, which can reduce a coupling effect between the first AMC structure unit 111 and the adjacent second AMC structure unit 112, and improve isolation between the first resonance frequency and the second resonance frequency. Therefore, the first resonance frequency is close to the second resonance frequency, that is, a ratio of the second resonance frequency to the first resonance frequency is low, and the ratio is in a range of 1.2 to 1.3. In addition, isolation between the first AMC structure unit 111 and the adjacent second AMC structure unit 112 is high, and adjusting a resonance frequency of one of the first AMC structure unit 111 and the adjacent second AMC structure unit 112 has little impact on a resonance frequency of the other one. Therefore, the resonance frequency of the first AMC structure unit 111 or the second AMC structure unit 112 may be separately adjusted, to reduce difficulty in adjusting the resonance frequency of the multi-frequency AMC structure 11.

For example, the internal patch 1112 of the first AMC structure unit 111 may be a square patch, and the external frame-shaped patch 1111 of the first AMC structure unit 111 may be a frame-shaped patch. In this way, the multi-frequency AMC structure 11 matches a shape of the housing, and is easy to design, process, and manufacture. It may be understood that a size of the internal patch 1112 in the first direction X may be different from a size of the internal patch 1112 in the second direction Y, and a size of the external frame-shaped patch 1111 in the first direction X may also be different from a size of the external frame-shaped patch 1111 in the second direction Y. This is not strictly limited in this embodiment of this application.

For example, the first linear patch 1121 is in a straight line shape, and the second linear patch 1122 is in a straight line shape. The first linear patch 1121 and the second linear patch 1122 are in the straight line shape, and are easy to process and manufacture, to improve production efficiency.

For example, one protrusion may be disposed on the linear patches 1121 and 1122. In some other embodiments, a plurality of protrusions may be disposed on the linear patch, and different protrusions may be disposed on the linear patch. This is not strictly limited in this embodiment of this application.

Figure 5:
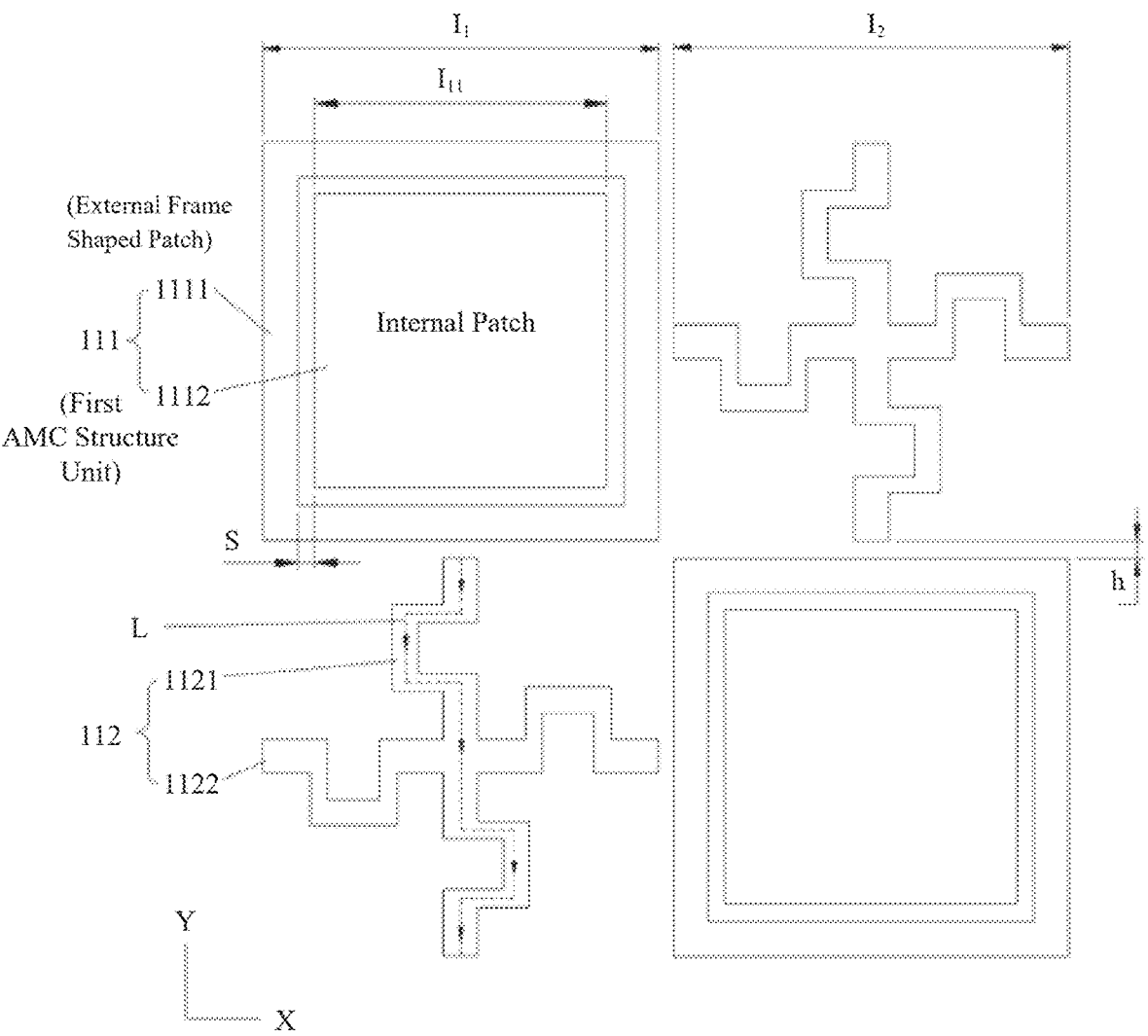
FIG. 5 is a schematic diagram of structures of a first AMC structure unit and a second AMC structure unit shown in FIG. 4.

FIG. 5 is a schematic diagram of structures of the first AMC structure unit 111 and the second AMC structure unit 112 shown in FIG. 4. As shown in FIG. 5, a size of the external frame-shaped patch 1111 in the first direction X is $l_1$, a size of the external frame-shaped patch 1111 in the second direction Y is equal to $l_1$, and the external frame-shaped patch 1111 is disposed around the internal patch 1112. A size of the internal patch 1112 in the first direction X is $l_{11}$, and a size of the internal patch 1112 in the second direction Y is equal to $l_{11}$. A gap between the internal patch 1112 and the external frame-shaped patch 1111 in the first direction X is S, and a gap between the internal patch 1112 and the external frame-shaped patch 1111 in the second direction Y is equal to S. A size of the second AMC structure unit 112 in the first direction X is $l_2$, and a size of the second AMC structure unit 112 in the second direction Y is equal to $l_2$. An actual length of the first linear patch 1121 of the second AMC structure unit 112 is L, where L is a length extending from a midpoint of a short side at one end of the linear patch to a midpoint of a short side at the other end of the linear patch, and an actual length of the second linear patch 1122 is equal to L. A spacing exists between the first AMC structure unit 111 and the second AMC structure unit 112 in the first direction X, and the spacing is h. A spacing also exists between the first AMC structure unit 111 and the second AMC structure unit 112 in the second direction Y, and the spacing in the second direction Y is equal to h.

In some embodiments, the plurality of first AMC structure units 111 have a same structure and a same size, and the plurality of second AMC structure units 111 have a same structure and a same size.

In some embodiments, the size $1_1$ is in a range of 0.15 times to 0.4 times the first wavelength, and the first wavelength is an equivalent dielectric wavelength corresponding to the first resonance frequency. For example, the size $1_1$ is 0.23 times the first wavelength. The size $1_{11}$ is in a range of 0.1 times to 0.3 times the first wavelength. For example, the size $1_{11}$ is 0.17 times the first wavelength. In some embodiments, h is 0.1 mm.

In some embodiments, the size 12 may be equal to the size $1_1$. For example, the size $1_1$ and the size $1_2$ are 2.3 mm.

Figure 6A:
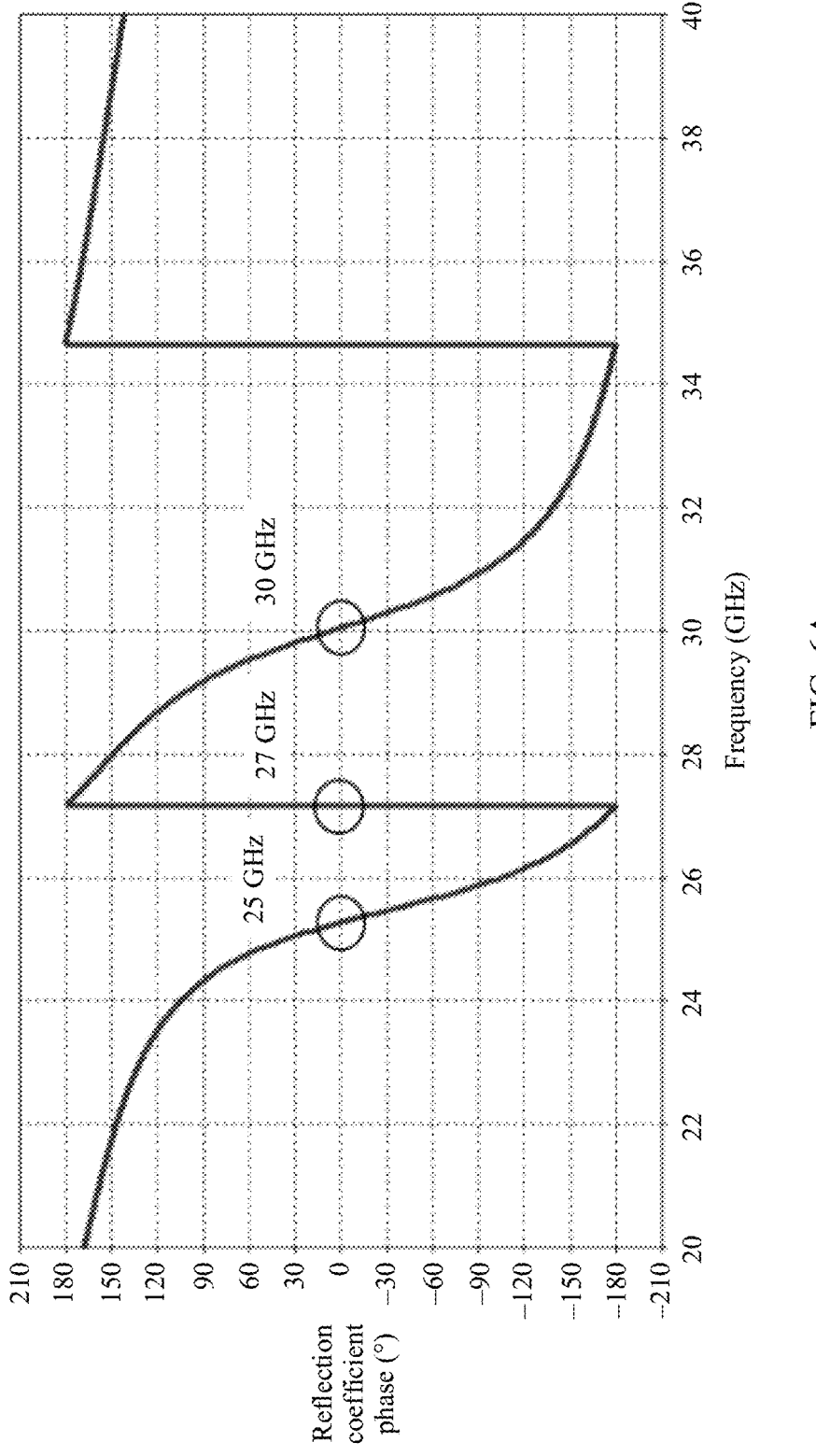
FIG. 6A is a reflection coefficient phase curve of a multi-frequency AMC structure shown in FIG. 4 in a possible implementation.
Figure 6B:
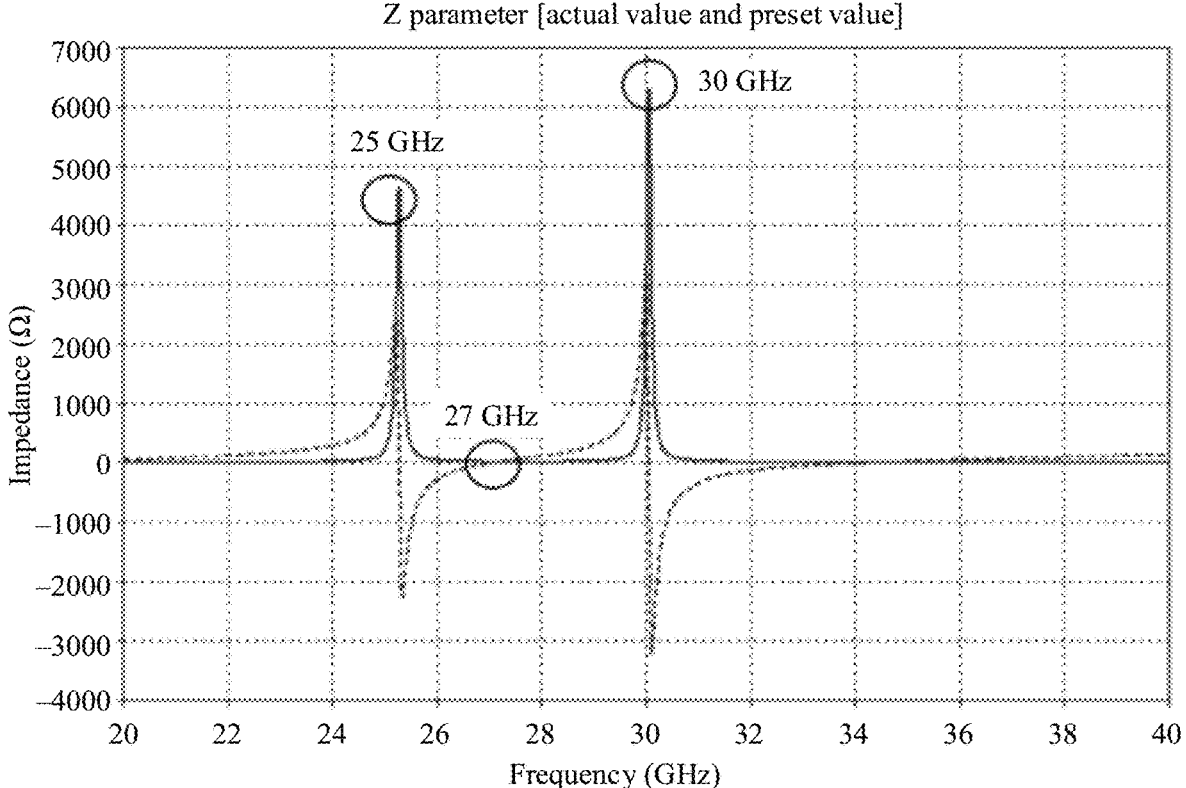
FIG. 6B is a surface-impedance curve of a multi-frequency AMC structure shown in FIG. 4 in a possible implementation.

FIG. 6A is a reflection coefficient phase curve of the multi-frequency AMC structure 11 shown in FIG. 4 in a possible implementation, and FIG. 6B is a surface-impedance curve of the multi-frequency AMC structure 11 shown in FIG. 4 in a possible implementation. As shown in FIG. 6A, there are three intersection points between the reflection coefficient phase curve and a horizontal axis whose reflection coefficient phase is 0°, which respectively represent a first resonance frequency 25 GHz, a two-modal joint point 27 GHz, and a second resonance frequency 30 GHz. As shown in FIG. 6B, on the surface-impedance curve, surface impedance at frequencies 25 GHz and 30 GHz is peak, and surface impedance at the frequency 27 GHz is 0.

In some embodiments, the reflection phase curve of the multi-frequency AMC structure 11 has two resonance frequencies, where the first resonance frequency is 25 GHz and the second resonance frequency is 30 GHz. At the first resonance frequency and the second resonance frequency, the multi-frequency AMC structure 11 presents an ideal magnetic conductor characteristic, that is, the reflection coefficient phase is 0°, impedance is high (more than 1000 ohms), and a magnetic field of a reflected wave is reverse to that of an incident wave. It may be understood that a surface wave generated by induction of a radiation field of the antenna 2 at the non-metallic plate body 12 is an incident wave, and the incident wave acts by the multi-frequency AMC structure 11 to generate a reflected wave opposite to a propagation direction of the incident wave. The reflection coefficient phase refers to a phase difference between an electric field of the reflected wave and that of the incident wave. If the reflection coefficient phase is 0°, an electric field propagation direction of the reflected wave is the same as that of the incident wave. In addition, a propagation direction of the reflected wave is opposite to that of the incident wave, according to a right-hand rule of the electric field, the magnetic field, and the propagation direction, it can be learned that the magnetic field of the reflected wave is reverse to that of the incident wave, which cancels the incident wave and limits propagation of the incident wave on the non-metallic plate body 12.

There is a two-modal joint point between the first resonance frequency and the second resonance frequency, and the frequency herein is 27 GHz. It can be seen from the reflection coefficient phase curve shown in FIG. 6A that, when a frequency of the radiation field of the antenna 2 is in a low frequency range (20 GHz to 25 GHz), the first AMC structure unit 111 acts on the radiation field, and then as the frequency increases, a structure unit that acts on the radiation field suddenly changes from the first AMC structure unit 111 to the second AMC structure unit 112. A frequency corresponding to a sudden change point is a frequency of the two-modal joint point. In this case, the multi-frequency AMC structure 11 presents a characteristic of an ideal conductor, that is, the impedance is 0 and the reflection coefficient phase is 180°, which can also suppress the propagation of the surface wave.

Figure 7A:
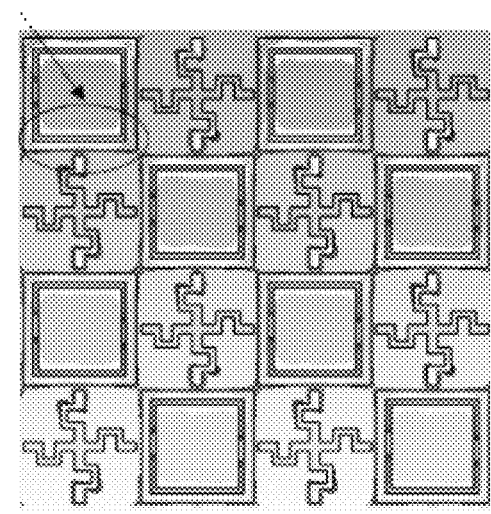
FIG. 7A is a distribution diagram of an electric field of a possible implementation of a multi-frequency AMC structure shown in FIG. 4 when a frequency is 25 GHz.
Figure 7B:
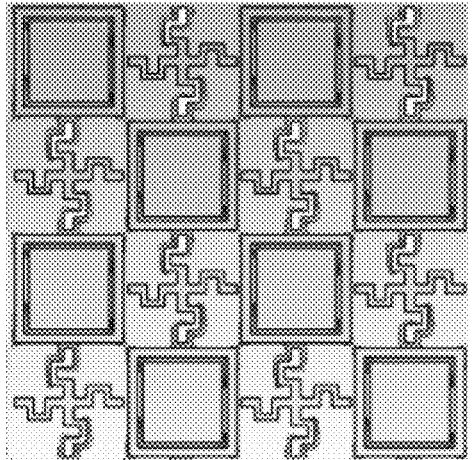
FIG. 7B is a distribution diagram of an electric field of a possible implementation of a multi-frequency AMC structure shown in FIG. 4 when a frequency is 27 GHz.
Figure 7C:
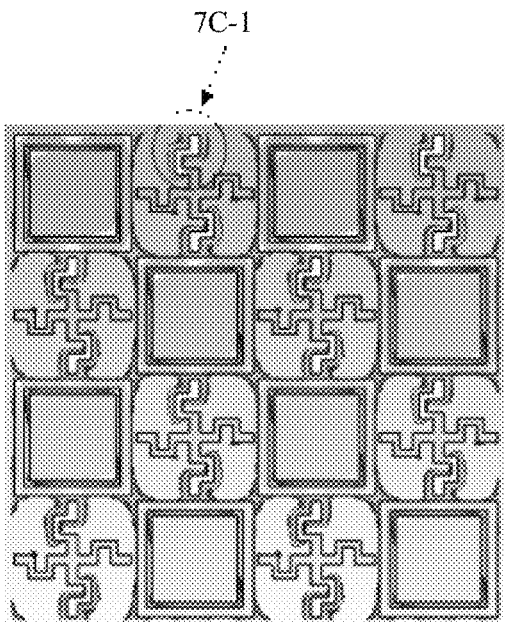
FIG. 7C is a distribution diagram of an electric field of a possible implementation of a multi-frequency AMC structure shown in FIG. 4 when a frequency is 30 GHz.

FIG. 7A, FIG. 7B, and FIG. 7C are respectively distribution diagrams of an electric field of a possible implementation of the multi-frequency AMC structure 11 shown in FIG. 4 when a frequency is 25 GHz, 27 GHz, or 30 GHz. A position with a light color in the figure is a position at which resonance occurs. A circled position 7A-1 in FIG. 7A indicates that the resonance occurs on the first AMC structure unit 111 at 25 GHz, and a circled position 7C-1 in FIG. 7C indicates that the resonance occurs on the second AMC structure unit 112 at 30 GHz.

In some embodiments, the multi-frequency AMC structure 11 may suppress the propagation of the surface wave in the operating frequency band (24.25 GHz to 29.5 GHz) of the antenna 2. FIG. 8A to FIG. 8D are respectively full views of a comparison diagram of a radiation field propagation waveform in a possible implementation of the antenna 2 shown in FIG. 1 at frequencies of 24.25 GHz, 25 GHz, 27 GHz, and 29.5 GHz with a radiation field propagation waveform in a conventional solution of the antenna 2 shown in FIG. 1 at frequencies of 24.25 GHz, 25 GHz, 27 GHz, and 29.5 GHz. 24.25 GHz and 29.5 GHz are two endpoints of the operating frequency band of the antenna 2, and 25 GHz and 27 GHz are two resonance frequencies corresponding to the multi-frequency AMC structure 11.

Figure 8A:
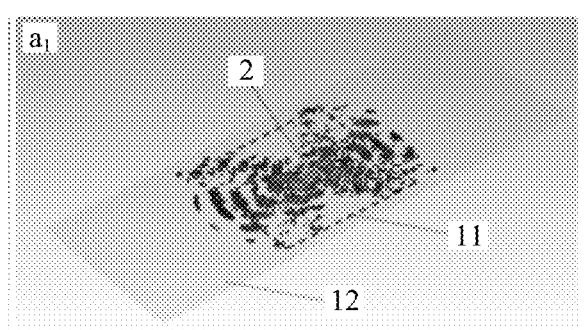
FIG. 8A is a full view of a comparison diagram of a radiation field propagation waveform in a possible implementation of an antenna shown in FIG. 1 at a frequency of 24.25 GHz with a radiation field propagation waveform in a conventional solution of the antenna shown in FIG. 1 at a frequency of 24.25 GHz.
Figure 8A:
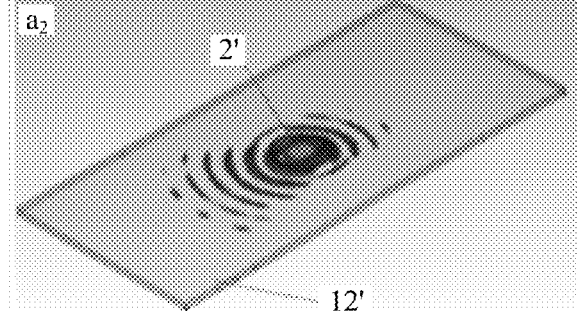
Figure 8B:
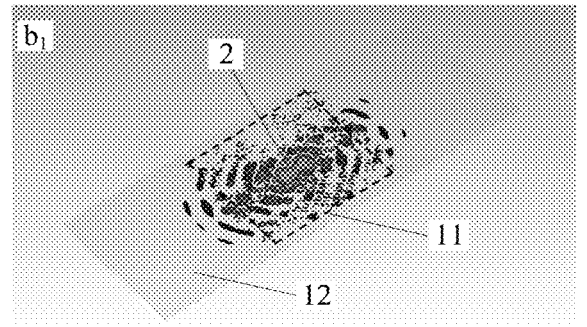
FIG. 8B is a full view of a comparison diagram of a radiation field propagation waveform in a possible implementation of an antenna shown in FIG. 1 at a frequency of 25 GHz with a radiation field propagation waveform in a conventional solution of the antenna shown in FIG. 1 at the frequency of 25 GHz.
Figure 8B:
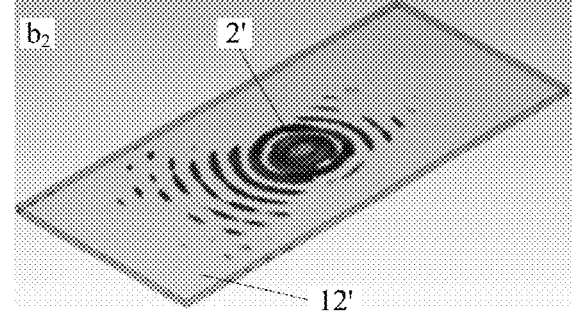
Figure 8C:
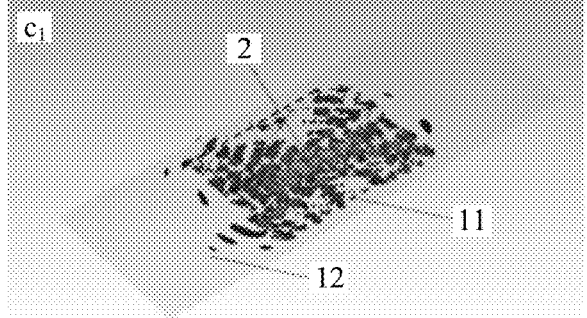
FIG. 8C is a full view of a comparison diagram of a radiation field propagation waveform in a possible implementation of an antenna shown in FIG. 1 at a frequency of 27 GHz with a radiation field propagation waveform in a conventional solution of the antenna shown in FIG. 1 at the frequency of 27 GHz.
Figure 8C:
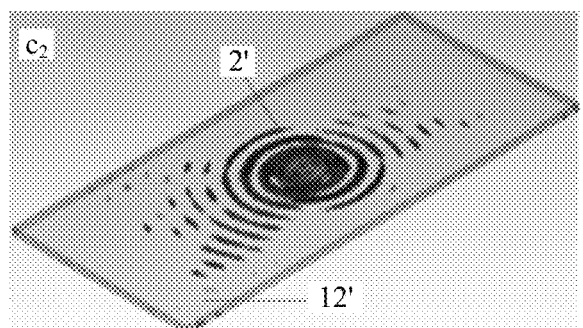
Figure 8D:
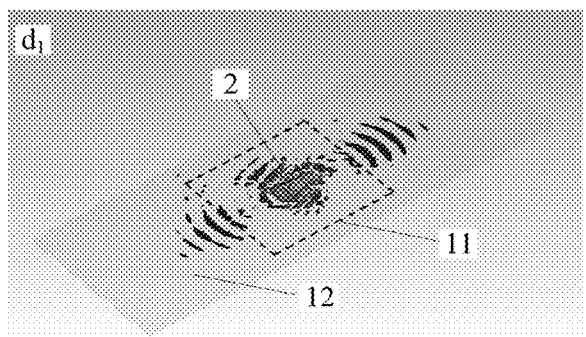
FIG. 8D is a full view of a comparison diagram of a radiation field propagation waveform in a possible implementation of an antenna shown in FIG. 1 at a frequency of 29.5 GHz with a radiation field propagation waveform in a conventional solution of the antenna shown in FIG. 1 at the frequency of 29.5 GHz.
Figure 8D:
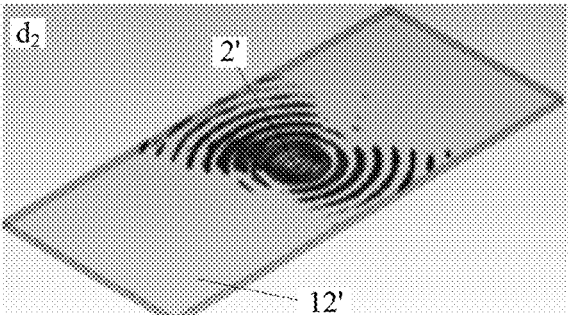
Figures 9A, 9B, 9C, 9D:
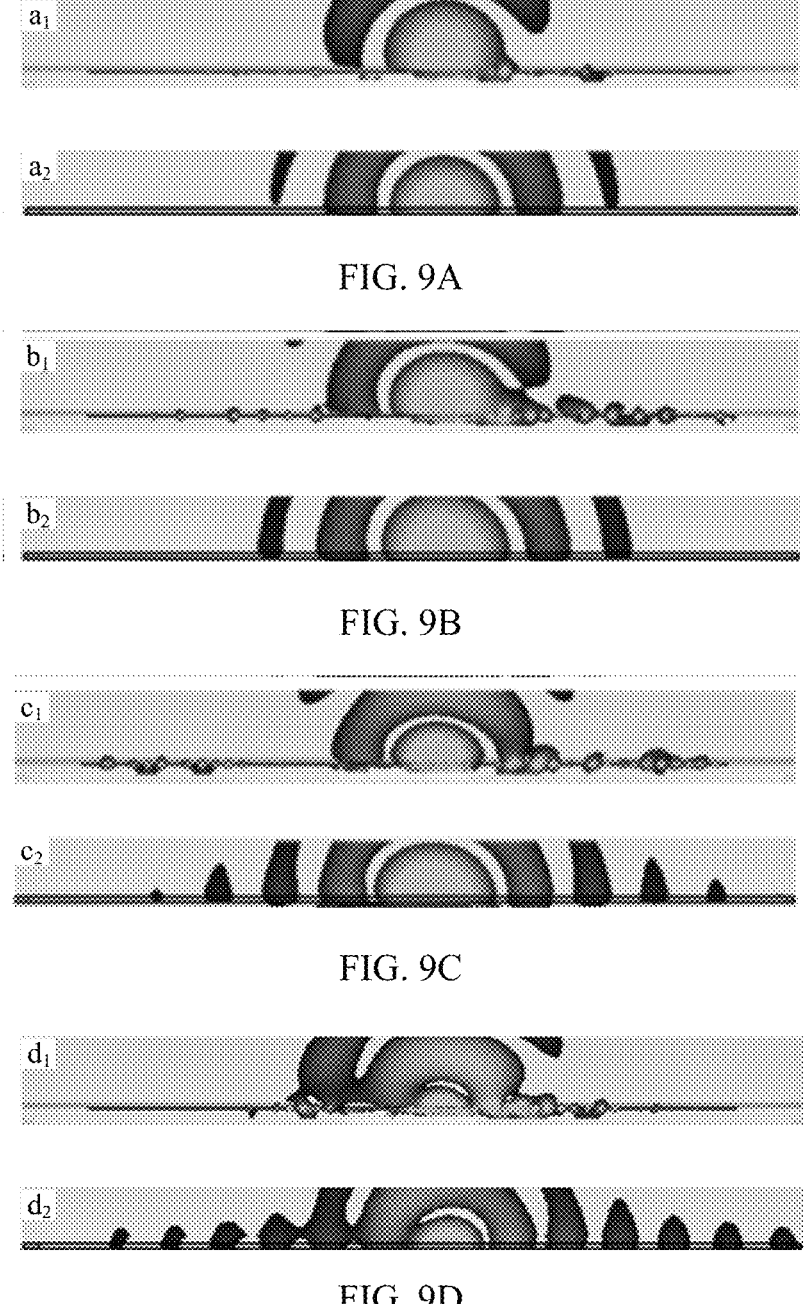
FIG. 9A is an XZ planar sectional view of a full view shown in FIG. 8A.
FIG. 9B is an XZ planar sectional view of a full view shown in FIG. 8B.
FIG. 9C is an XZ planar sectional view of a full view shown in FIG. 8C.
FIG. 9D is an XZ planar sectional view of a full view shown in FIG. 8D.
Figures 10A, 10B, 10C, 10D:
FIG. 10A is a YZ planar sectional view of a full view shown in FIG. 8A.
FIG. 10B is a YZ planar sectional view of a full view shown in FIG. 8B.
FIG. 10C is a YZ planar sectional view of a full view shown in FIG. 8C.
FIG. 10D is a YZ planar sectional view of a full view shown in FIG. 8D.

An a2 part of FIG. 8A is a full view of the conventional solution at the frequency of 24.25 GHz, a b2 part of FIG. 8B is a full view of the conventional solution at the frequency of 25 GHz, a c2 part of FIG. 8C is a full view of the conventional solution at the frequency of 27 GHz, and a d2 part of FIG. 8D is a full view of the conventional solution at the frequency of 29.5 GHz. The figure shows an antenna 2' and a back cover 12' of the conventional solution. The antenna 2' is located below the back cover 12', an electromagnetic wave of the antenna 2' forms an obvious surface wave on the back cover 12'.

An $a_1$ part in FIG. 8A is a full view of a possible implementation of the antenna 2 shown in FIG. 1 at the frequency of 24.25 GHz, a $b_1$ part in FIG. 8B is a full view of a possible implementation of the antenna 2 shown in FIG. 1 at the frequency of 25 GHz, a $c_1$ part of FIG. 8C is a full view of a possible implementation of the antenna 2 shown in FIG. 1 at the frequency of 27 GHz, and a $d_1$ part of FIG. 8D is a full view of a possible implementation of the antenna 2 shown in FIG. 1 at the frequency of 29.5 GHz. A dashed box represents a position of the multi-frequency AMC structure 11. Compared with the $a_2$, $b_2$, $c_2$, and $d_2$ parts, it can be learned that after the multi-frequency AMC structure 11 is disposed, a range in which the electromagnetic wave spreads around by using the antenna 2 as a center becomes smaller. Therefore, the multi-frequency AMC structure 11 has a good capability of suppressing the surface wave in the operating frequency band of the antenna 2.

FIG. 9A to FIG. 9D are respectively XZ planar sectional views of the full views shown in FIG. 8A to FIG. 8D, and FIG. 10A to FIG. 10D are respectively YZ planar sectional views of the full views shown in FIG. 8A to FIG. 8D. Compared with a conventional solution, a range in which an electromagnetic wave spreads around by using the antenna 2 as a center is reduced. This indicates that propagation of the electromagnetic wave between the non-metallic plate body 12 and a system ground plane can be reduced by disposing the multi-frequency AMC structure 11. In addition, the propagation of the surface wave on the non-metallic plate body 12 is suppressed.

Figure 11A:
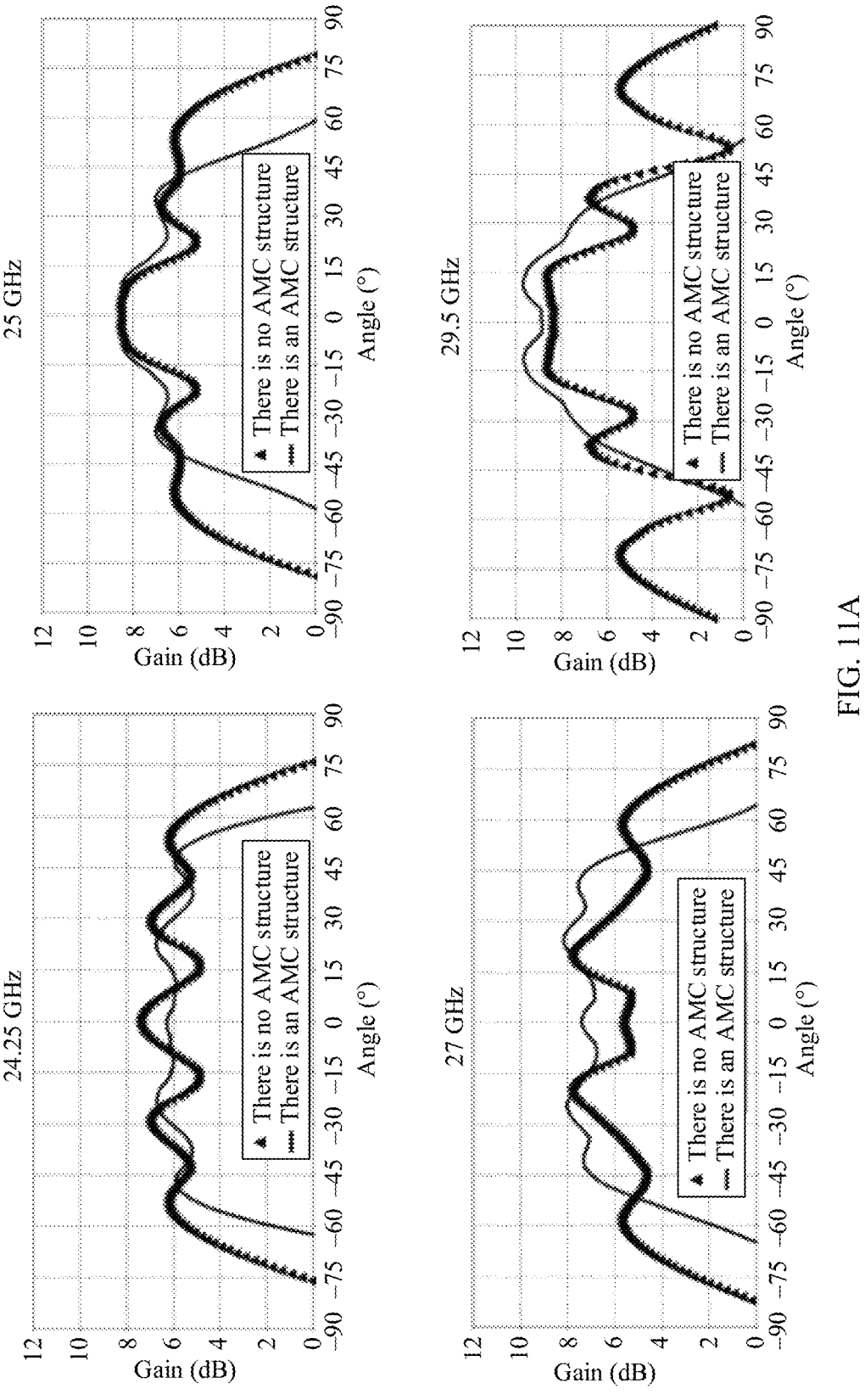
FIG. 11A is a comparison diagram of synthesis results of vertical polarization (V-pol) radiation patterns on an XZ plane between a possible implementation of an antenna shown in FIG. 1 at frequencies of 24.25 GHz, 25 GHz, 27 GHz, and 29.5 GHz and a conventional solution of an antenna shown in FIG. 1 at frequencies of 24.25 GHz, 25 GHz, 27 GHz, and 29.5 GHz.

FIG. 11A is a comparison diagram of synthesis results of vertical polarization (V-pol) radiation patterns on an XZ plane between a possible implementation of the antenna 2 shown in FIG. 1 at frequencies of 24.25 GHz, 25 GHz, 27 GHz, and 29.5 GHz and a conventional solution of the antenna 2 shown in FIG. 1 at frequencies of 24.25 GHz, 25 GHz, 27 GHz, and 29.5 GHz. Table 1.1 is a comparison table of benefits of vertical polarization radiation patterns. When a gain of a synthesis pattern reaches 6 dB, a valid 3 dB bandwidth (beamwidth) is defined.

TABLE 1.1

| | | Set a multi-frequency AMC structure 11 | | | No multi-frequency AMC structure 11 | | |
|---|---|---|---|---|---|---|---|
| | Frequency (GHz) | Scan angle (°) | Peak gain (dBi) | Ripple at a peak value (dB) | Scan angle (°) | Peak gain (dBi) | Ripple at a peak value (dB) |
| Vertical polarization | 24.25 | 60.8 | 7.1 | 1.1 | 19 | 7.2 | 2.2 |
| | 25 | 86.2 | 8.5 | 1.1 | 35.7 | 8.4 | 2.9 |
| | 27 | 98.4 | 8.3 | 1.5 | 18 + 18 (two peaks) | 7.8 | 2.5 |
| | 29.5 | 46.8 | 9.7 | 0.9 | 46.9 | 8.6 | 3.6 |

As can be seen from FIG. 11A and Table 1.1, effective 3 dB bandwidths of the multi-frequency AMC structure 11, 24.25 GHz, 25 GHz, 27 GHz, and 29.5 GHz respectively increase from 19°, 35.7°, 18°+18°, 46.9° to 60.8°, 86.2°, 98.4° and 46.8° through setting, to effectively improve a synthesis effect of the radiation patterns.

Figure 11B:
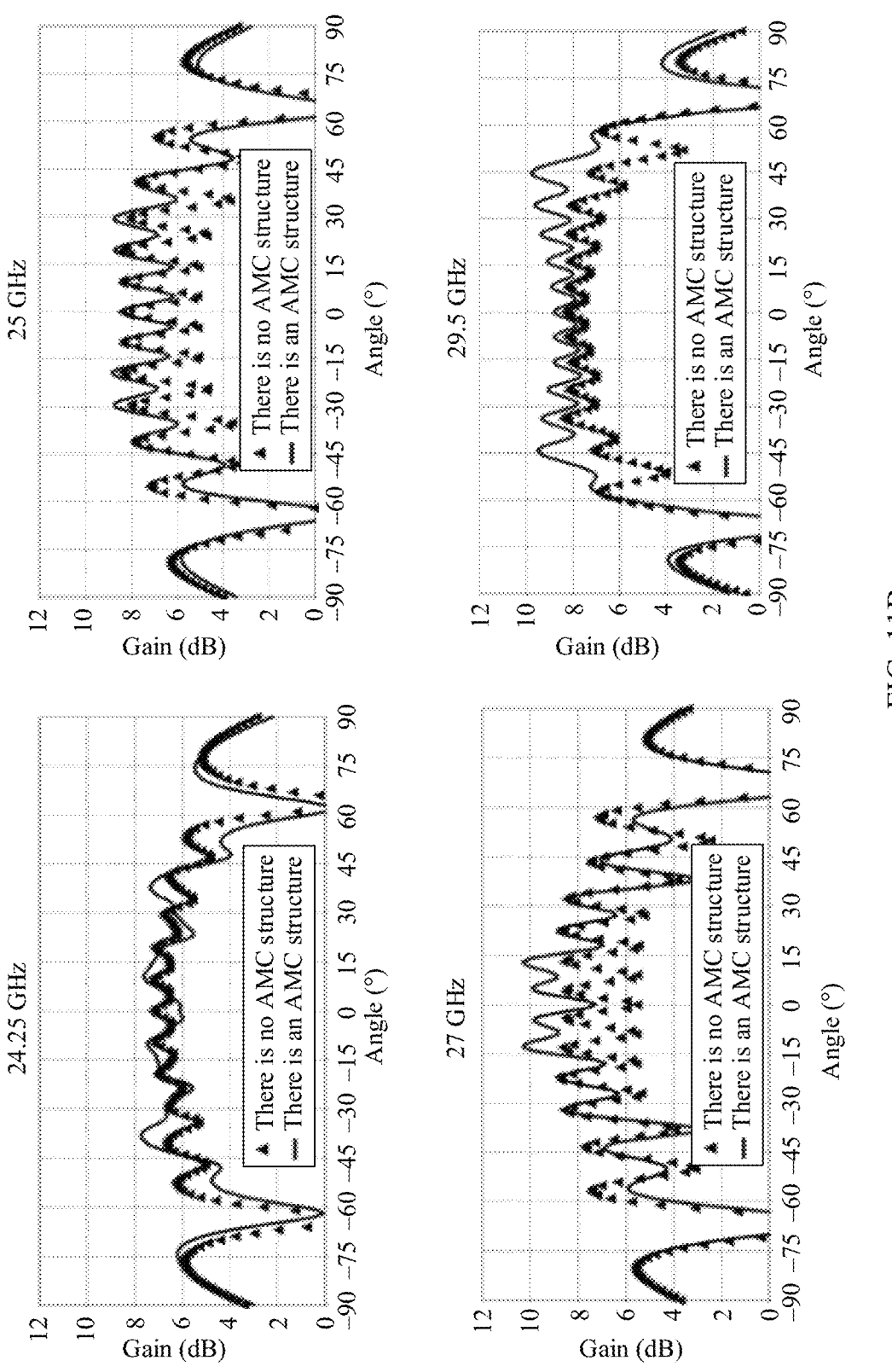
FIG. 11B is a comparison diagram of ripple improvement effects of vertical polarization (V-pol) radiation patterns on a YZ plane between a possible implementation of an antenna shown in FIG. 1 at frequencies of 24.25 GHz, 25 GHz, 27 GHz, and 29.5 GHz and a conventional solution of an antenna shown in FIG. 1 at frequencies of 24.25 GHz, 25 GHz, 27 GHz, and 29.5 GHz.

Refer to both FIG. 11B and Table 1.1. FIG. 11B is a comparison diagram of ripple (ripple) improvement effects of vertical polarization (V-pol) radiation patterns on a YZ plane between a possible implementation of the antenna 2 shown in FIG. 1 at frequencies of 24.25 GHz, 25 GHz, 27 GHz, and 29.5 GHz and a conventional solution of the antenna shown in FIG. 1 at frequencies of 24.25 GHz, 25 GHz, 27 GHz, and 29.5 GHz. A synthesis pattern ripple in the YZ plane is improved by 1.5 dB to 2 dB in a frequency band.

Figure 11C:
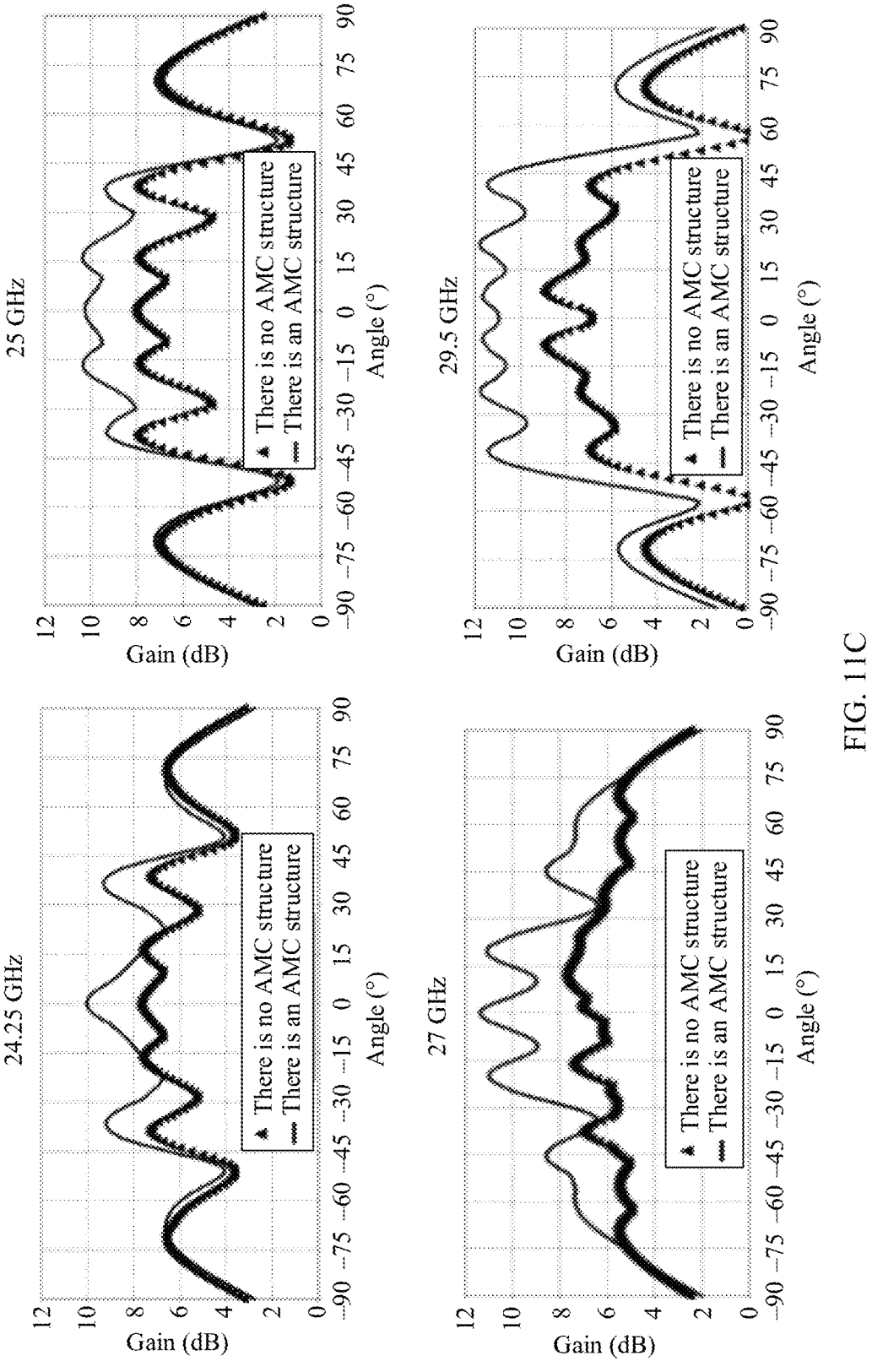
FIG. 11C is a comparison diagram of synthesis results of horizontal polarization (H-pol) radiation patterns on an XZ plane between a possible implementation of an antenna shown in FIG. 1 at frequencies of 24.25 GHz, 25 GHz, 27 GHz, and 29.5 GHz and a conventional solution of an antenna shown in FIG. 1 at frequencies of 24.25 GHz, 25 GHz, 27 GHz, and 29.5 GHz.

FIG. 11C is a comparison diagram of synthesis results of horizontal polarization (H-pol) radiation patterns on an XZ plane between a possible implementation of the antenna 2 shown in FIG. 1 at frequencies of 24.25 GHz, 25 GHz, 27 GHz, and 29.5 GHz and a conventional solution of the antenna shown in FIG. 1 at frequencies of 24.25 GHz, 25 GHz, 27 GHz, and 29.5 GHz. Table 1.2 is a comparison table of benefits of horizontal polarization radiation patterns.

TABLE 1.2

| | | Set a multi-frequency AMC structure 11 | | | No multi-frequency AMC structure 11 | | |
|---|---|---|---|---|---|---|---|
| | Frequency (GHz) | Scan angle (°) | Peak gain (dBi) | Ripple at a peak value (dB) | Scan angle (°) | Peak gain (dBi) | Ripple at a peak value (dB) |
| Horizontal polarization | 24.25 | 91.6 | 10.1 | 2.7 | 49 | 7.9 | 2.3 |
| | 25 | 86 | 10.1 | 0.8 | 46.4 | 8.1 | 3.2 |
| | 27 | 58.1 | 11 | 1.4 | 53.7 | 7.6 | 1 |
| | 29.5 | 98 | 11.6 | 1.2 | 61 | 8.7 | 2.1 |

As can be seen from FIG. 11C and Table 1.2, effective 3 dB bandwidths of the multi-frequency AMC structure 11, 24.25 GHz, 25 GHz, 27 GHz, and 29.5 GHz respectively increase from 49°, 46.4°, 53.7°, 61° to 91.6°, 86°, 58.1°, and 98° through setting.

Figure 11D:
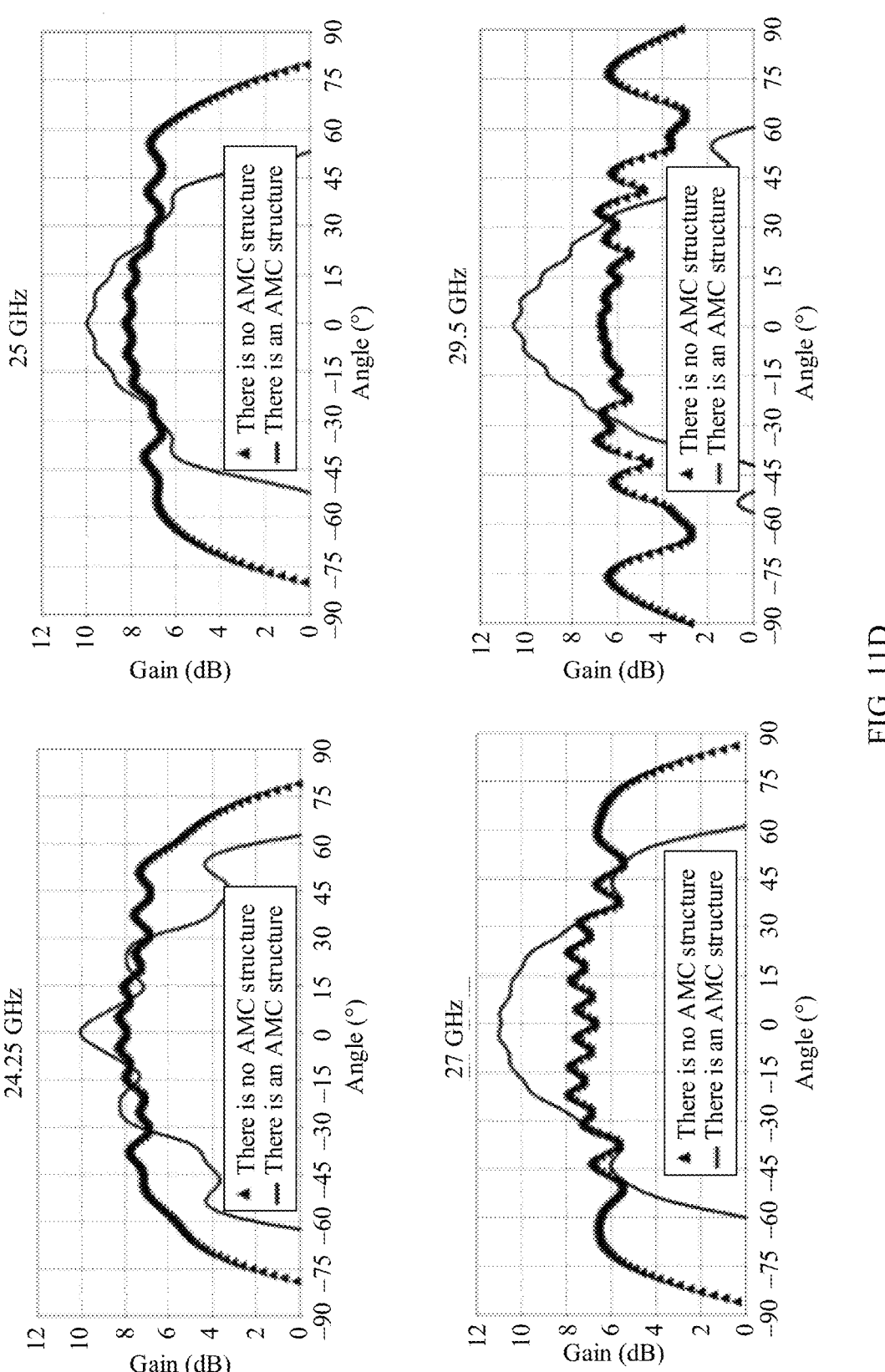
FIG. 11D is a comparison diagram of ripple improvement effects of horizontal polarization (H-pol) radiation patterns on a YZ plane between a possible implementation of an antenna shown in FIG. 1 at frequencies of 24.25 GHz, 25 GHz, 27 GHz, and 29.5 GHz and a conventional solution of an antenna shown in FIG. 1 at frequencies of 24.25 GHz, 25 GHz, 27 GHz, and 29.5 GHz.

Refer to both FIG. 11D and Table 1.2. FIG. 11D is a comparison diagram of ripple improvement effects of horizontal polarization (H-pol) radiation patterns on a YZ plane between a possible implementation of the antenna 2 shown in FIG. 1 at frequencies of 24.25 GHz, 25 GHz, 27 GHz, and 29.5 GHz and a conventional solution of the antenna shown in FIG. 1 at frequencies of 24.25 GHz, 25 GHz, 27 GHz, and 29.5 GHz. A synthesis field ripple in the YZ plane is improved by 0.5 dB in a frequency band. At 25 GHz, the synthesis field ripple has a largest increment, up to 3 dB. At 29.5 GHz, a null (null) problem of a synthesis pattern in the third direction Z is resolved by setting the multi-frequency AMC structure 11.

TABLE 1.3

| | Vertical polarization ripple (±40°, dB) | | Horizontal polarization ripple (±40°, dB) | |
|---|---|---|---|---|
| Frequency (GHz) | Set a multi-frequency AMC structure 11 | Conventional solution No multi-frequency AMC structure 11 | Set a multi-frequency AMC structure 11 | Conventional solution No multi-frequency AMC structure 11 |
| 24.25 | 1.5 (three field-pattern pits) | 1 (average) | 1 (two field-pattern pits) | 0.7 (average) |
| 25 | 2.4 (average) | 4.4 (average) | None | 0.6 (average) |
| 27 | 1.7 (average) | 3 (average) | None | 1 (average) |
| 29.5 | 0.7 (average) | 0.7 (average) | None | 1.5 (two field-pattern zero points) |

Table 1.3 is a comparison table of benefits of vertical and horizontal polarization radiation patterns on the XY plane between a possible implementation of the antenna 2 shown in FIG. 1 at frequencies of 24.25 GHz, 25 GHz, 27 GHz, and 29.5 GHz and a conventional solution at frequencies of 24.25 GHz, 25 GHz, 27 GHz, and 29.5 GHz. Because a high-impedance surface formed by the multi-frequency AMC structure 11 has an in-phase reflection characteristic, compared with a conventional solution, disposing the multi-frequency AMC structure 11 increases the peak gain of the radiation pattern by about 1.5 dB to 2.5 dB.

Figure 12:
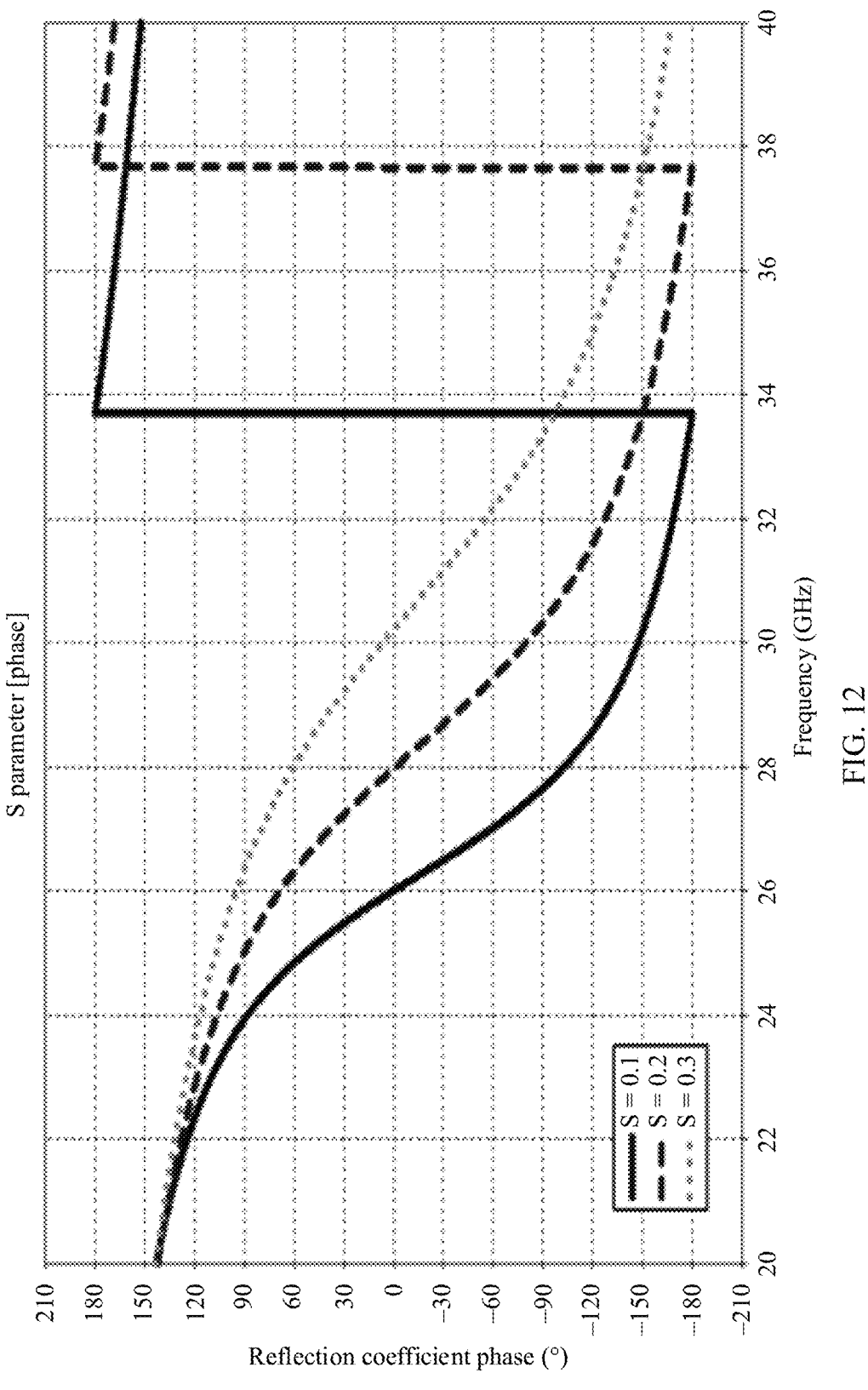
FIG. 12 is a reflection coefficient phase curve of a possible implementation of a first AMC structure unit shown in FIG. 5 when a gap is 0.1 mm, 0.2 mm, or 0.3 mm.

FIG. 12 is a reflection coefficient phase curve when a gap S is 0.1 mm, 0.2 mm, and 0.3 mm in a possible implementation of the first AMC structure unit 111 shown in FIG. 5. The resonance frequency of the first AMC structure unit 111 is determined by a coupling amount between the internal patch 1112 and the external frame-shaped patch 1111, and the coupling amount is related to the gap S between the internal patch 1112 and the external frame-shaped patch 1111. It can be learned from FIG. 12 that a smaller gap S indicates a lower resonance frequency. Therefore, the resonance frequency of the first AMC structure unit 111 may be adjusted by controlling a size of the gap between the internal patch 1112 and the external frame-shaped patch 1111.

Figure 13A:
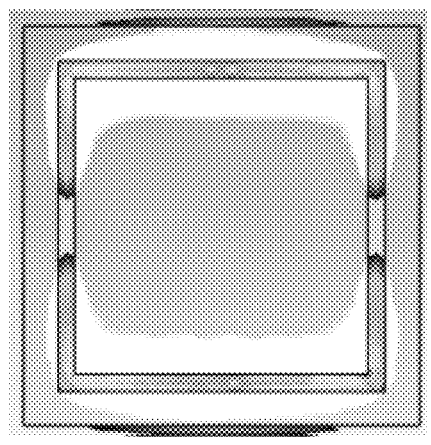
FIG. 13A is a distribution diagram of an electric field of a possible implementation of a first AMC structure unit shown in FIG. 5 when a gap is 0.1 mm.
Figure 13B:
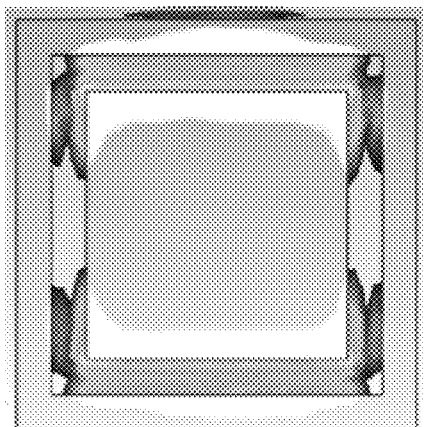
FIG. 13B is a distribution diagram of an electric field of a possible implementation of a first AMC structure unit shown in FIG. 5 when a gap is 0.2 mm.
Figure 13C:
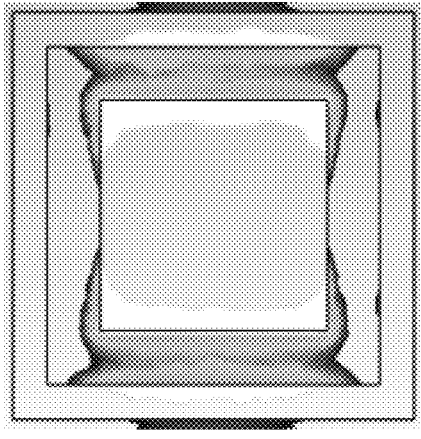
FIG. 13C is a distribution diagram of an electric field of a possible implementation of a first AMC structure unit shown in FIG. 5 when a gap is 0.3 mm.

FIG. 13A to FIG. 13C are respectively electric field distribution diagrams of a possible implementation of the first AMC structure unit 111 shown in FIG. 5 when the gap S is 0.1 mm, 0.2 mm, and 0.3 mm. It can be seen from FIG. 13A to FIG. 13C that, as the gap S increases, the coupling amount also increases.

In some embodiments, the size of the gap is in a range of 0.005 times to 0.04 times a first wavelength. For example, the gap S is 0.01 times the first wavelength.

Figure 14:
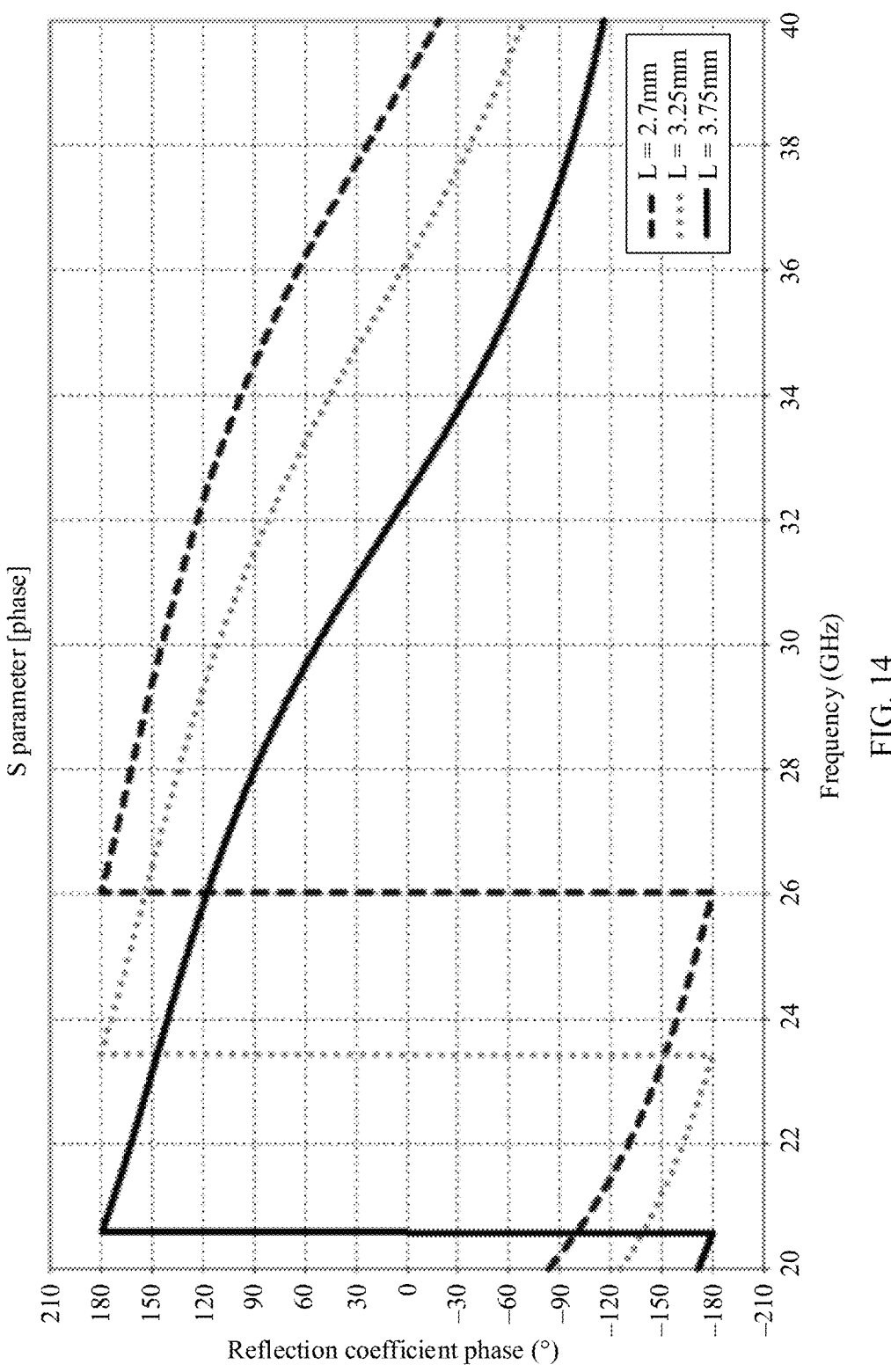
FIG. 14 is a reflection coefficient phase curve of a possible implementation of a second AMC structure unit shown in FIG. 5 when an actual length is 2.7 mm, 3.25 mm, or 3.75 mm.

FIG. 14 is a reflection phase coefficient curve of a possible implementation of the second AMC structure unit 112 shown in FIG. 5 when actual lengths L are 2.7 mm, 3.25 mm, and 3.75 mm. It can be learned from FIG. 14 that a longer actual length L indicates a lower resonance frequency of the second AMC structure unit 112.

In some embodiments, the resonance frequency of the second AMC structure unit 112 may be adjusted by controlling actual lengths L of the linear patches 1121 and 1122 of the second AMC structure unit 112. The actual lengths L of the linear patches 1121 and 1122 may be changed by increasing or decreasing a quantity of protrusions of the linear patches 1121 and 1122 and/or shapes and sizes of the protrusions.

In some embodiments, a size of the actual length L is in a range of 0.3 times to 0.6 times the first wavelength. For example, the actual length L is 0.45 times the first wavelength.

In some embodiments, the resonance frequency range of the multi-frequency AMC structure 11 may be adjusted by adjusting resonance frequencies of the first AMC structure unit 111 and/or the second AMC structure unit 112. It is easier to adjust and control the resonance frequency, so that different operating frequencies of the antenna 2 can be matched, to meet increasingly diversified requirements of a consumer.

Figure 15A:
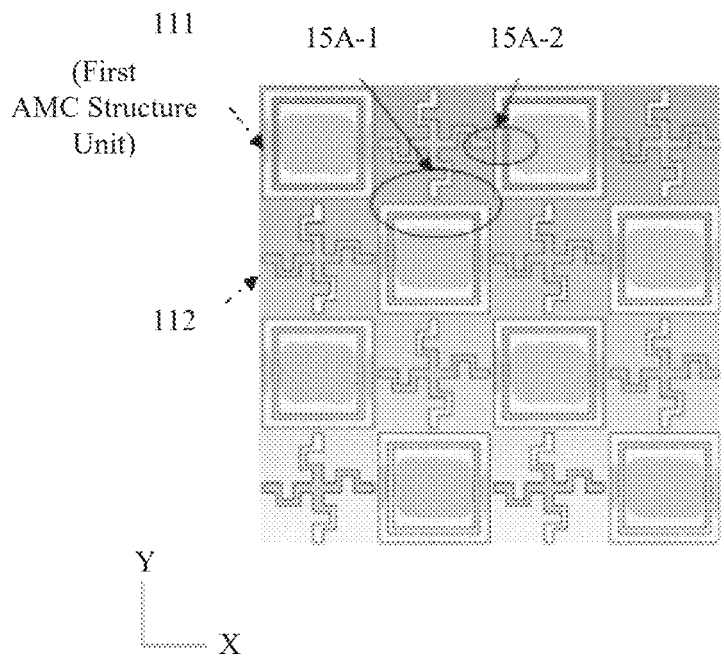
FIG. 15A is a distribution diagram of an electric field of a multi-frequency AMC structure shown in FIG. 4.
Figure 15B:
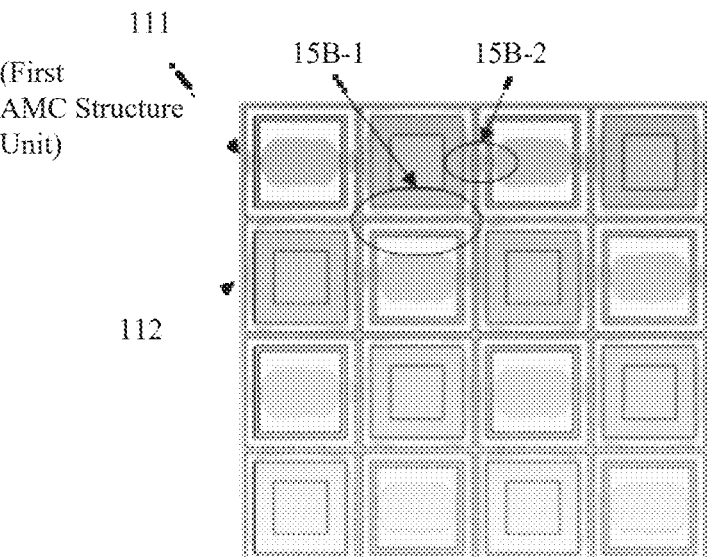
FIG. 15B is a distribution diagram of an electric field of another possible implementation of a multi-frequency AMC structure according to an embodiment of this application.

Refer to FIG. 15A and FIG. 15B together. FIG. 15A is an electric field distribution diagram of the multi-frequency AMC structure 11 shown in FIG. 4, and the multi-frequency AMC structure 11 shown in FIG. 4 is formed by DRS+Cross structure units. A part circled by 15A-1 in FIG. 15A represents an electric field coupling amount between the first AMC structure unit 111 and the second AMC structure unit 112 in the second direction Y, a part circled by 15A-2 in FIG. 15A represents an electric field coupling amount between the first AMC structure unit 111 and the second AMC structure unit 112 in the first direction X, and a brighter area represents a large coupling amount. It can be learned from FIG. 15A that the electric field coupling amount circled by 15A-1 in the second direction Y is greater than the electric field coupling amount circled by 15A-2 in the first direction X.

FIG. 15B is a distribution diagram of an electric field of a possible implementation of a multi-frequency AMC structure 11 according to an embodiment of this application. The multi-frequency AMC structure 11 in this embodiment may include some features of the multi-frequency AMC structure 11 in the foregoing embodiment. Similar parts of the two are not described again. The following mainly describes differences between the two. As shown in FIG. 15B, in another implementation, both the first AMC structure unit 111 and the second AMC structure unit 112 use a DSR structure, that is, the multi-frequency AMC structure 11 is formed by dual DSR structure units. A gap S between the external frame-shaped patch 1111 and the internal patch 1112 of the first AMC structure unit 111 is smaller than that of the second AMC structure unit 112. A part circled by 15B-1 in FIG. 15B represents an electric field coupling amount between the first AMC structure unit 111 and the second AMC structure unit 112 in the second direction Y, and a part circled by 15B-2 represents an electric field coupling amount between the first AMC structure unit 111 and the second AMC structure unit 112 in the first direction X. It can be learned from FIG. 15B that the electric field coupling amount circled by 15B-1 in the second direction Y is greater than the electric field coupling amount circled by 15B-2 in the first direction X.

By comparing the parts circled by 15A-2 and 15B-2, it can be seen that a coupling amount between the DSR structure units 111 the first direction X is greater than a coupling amount between a DSR structure unit and a cross structure unit.

In some embodiments, a broadside radiation (broadside radiation) antenna of the antenna 2 is placed below the opening 13 in the middle part of the multi-frequency AMC structure 11, a direction of an electric field of an electromagnetic wave transmitted by the antenna 2 is the second direction Y, and an electric field coupling amount in the second direction Y is required. In addition, electric field coupling in the first direction X is avoided. Electric field coupling of the multi-frequency AMC structure 11 formed by using the DRS+Cross structure units 111 the first direction X is small, it is easy to adjust a resonance frequency range of the multi-frequency AMC structure 11 by separately adjusting resonance frequencies of the two structure units, and it is easy to integrate with the antenna 2 and import the antenna 2 into the terminal 100.

Figure 16A:
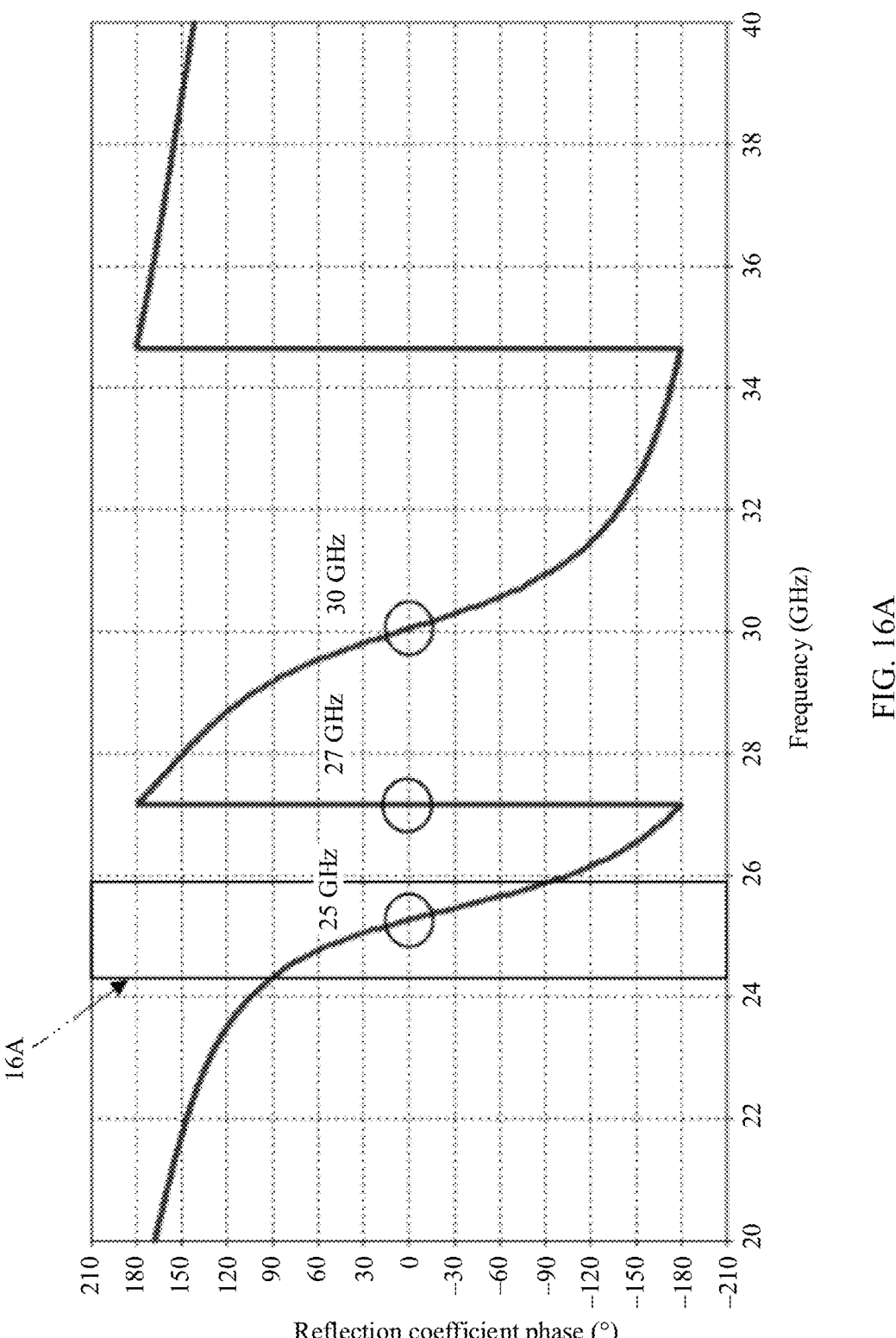
FIG. 16A is a reflection coefficient phase curve of a multi-frequency AMC structure that uses a DRS+Cross structure shown in FIG. 15A.
Figure 16B:
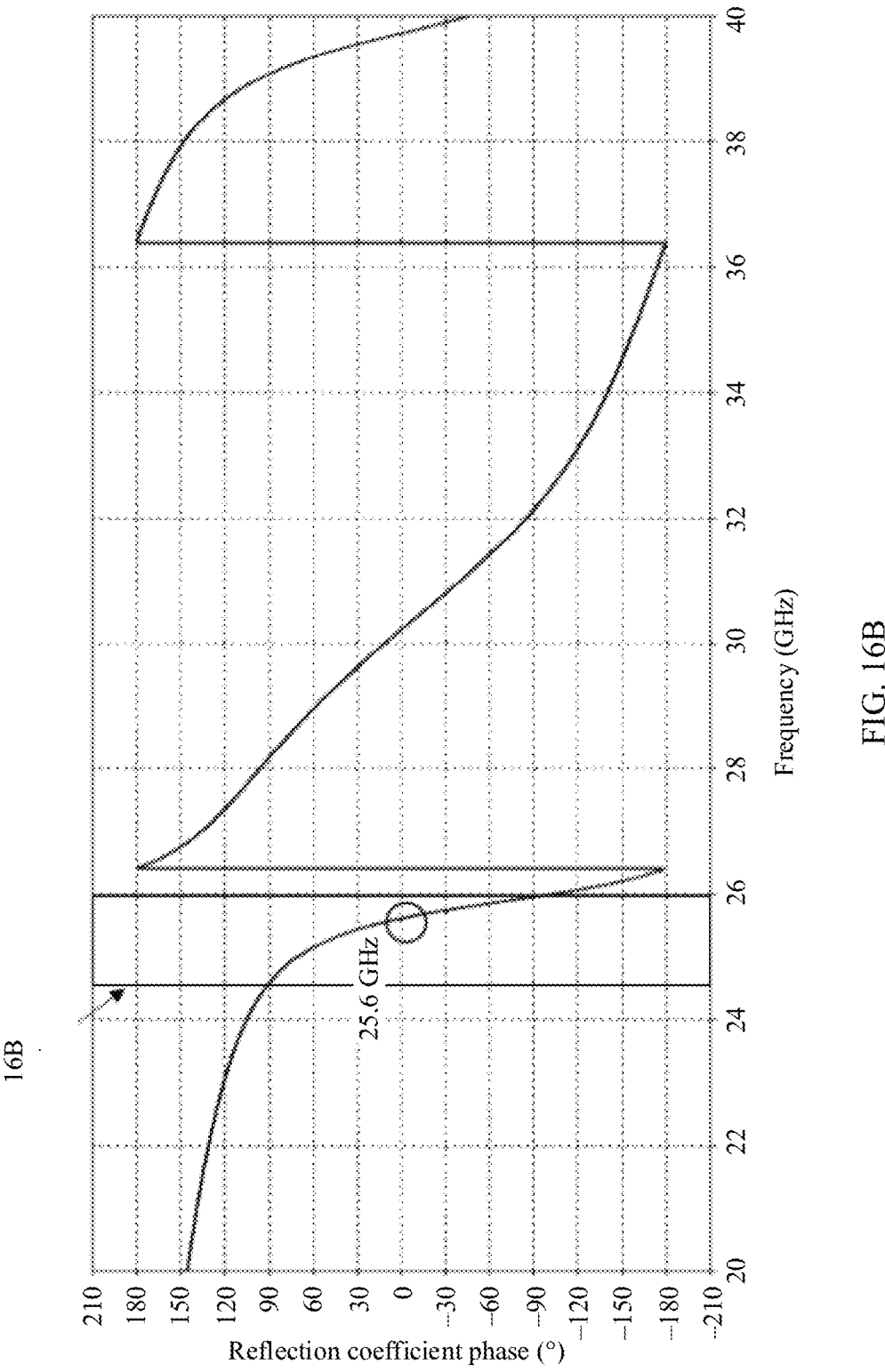
FIG. 16B is a reflection coefficient phase curve of a multi-frequency AMC structure that uses a dual DSR structure shown in FIG. 15B.

FIG. 16A is a reflection coefficient phase curve of the multi-frequency AMC structure 11 that uses the DRS+Cross structure shown in FIG. 15A, a part framed in 16A is a response frequency bandwidth of the first AMC structure unit 111 shown in FIG. 15A. FIG. 16B is a reflection coefficient phase curve of the multi-frequency AMC structure 11 that uses a dual DSR structure shown in FIG. 15B. A part framed in 16B is the response frequency bandwidth of the first AMC structure unit 111 shown in FIG. 15B. By comparing parts framed in 6A and 16A, it can be seen that the response frequency bandwidth of the multi-frequency AMC structure 11 that uses the DRS+Cross structure is reduced by 0.8 GHz compared with the response frequency bandwidth of the multi-frequency AMC structure 11 that uses the dual DSR structure.

A resonance of the first AMC structure unit 111 of the multi-frequency AMC structure 11 that uses the dual DSR structure is likely affected by the second AMC structure unit 112, so that a response frequency bandwidth of the first AMC structure unit 111 is compressed. That is, if a required first resonance frequency is close to the second resonance frequency, when the resonance frequency of the second AMC structure unit 112 is adjusted, the resonance frequency of the first AMC structure unit 111 is also affected, which is difficult to reach a required range of the second resonance frequency. The isolation between the first AMC structure unit 111 and the second AMC structure unit 112 of the multi-frequency AMC structure 11 that uses the DRS+Cross structure in the first direction X is high. When the resonance frequency of the second AMC structure unit 112 is adjusted, impact on the resonance frequency of the first AMC structure unit 111 is small, and a similar resonance frequency can be obtained.

Figure 17:
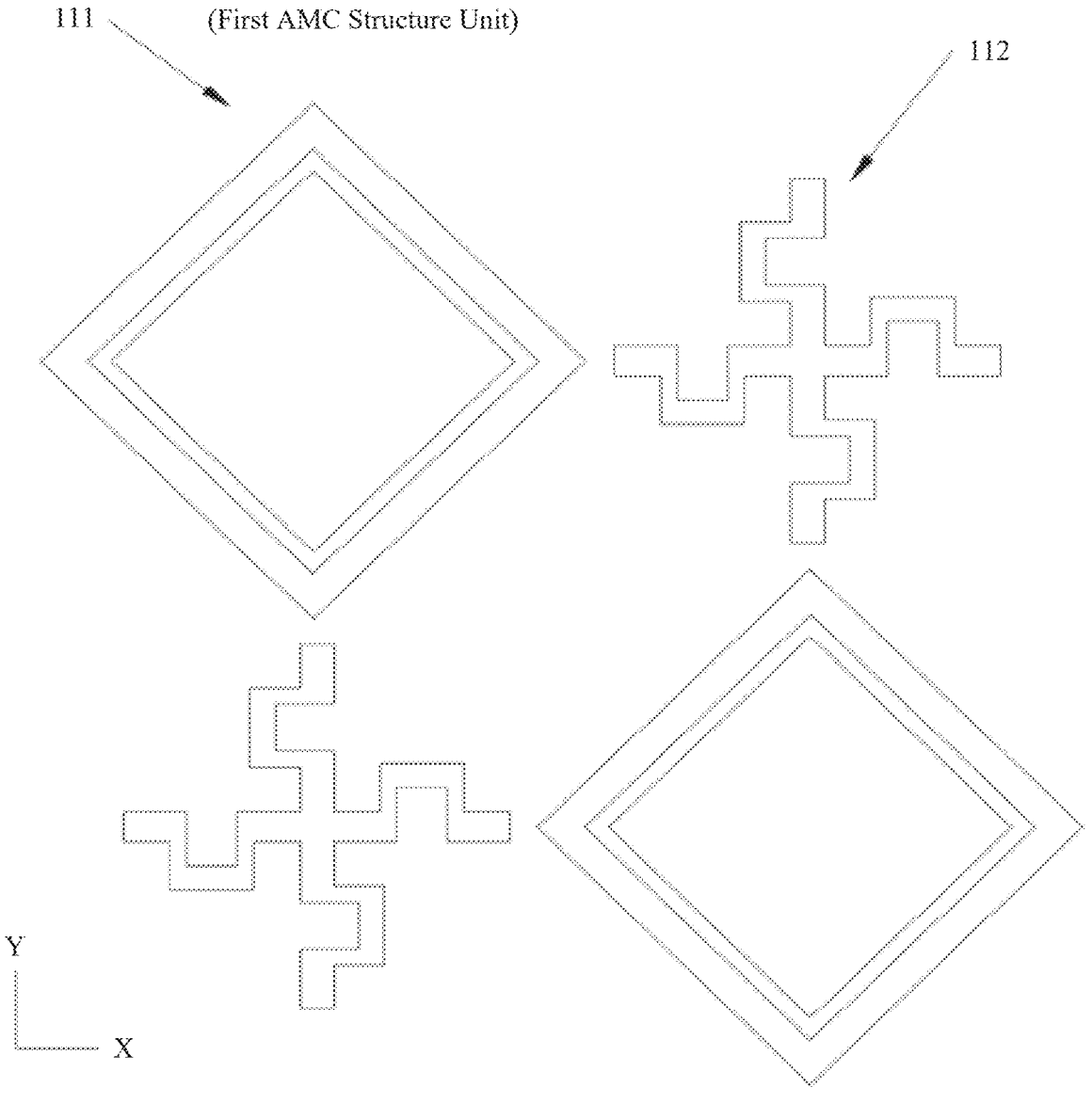
FIG. 17 is a schematic diagram of a structure of a possible arrangement manner of a first AMC structure unit and a second AMC structure unit shown in FIG. 4.

FIG. 17 is a schematic diagram of a structure of a possible arrangement manner of the first AMC structure unit 111 and the second AMC structure unit 112 shown in FIG. 4. The multi-frequency AMC structure 11 in this embodiment may include some features of the multi-frequency AMC structure 11 in the embodiment shown in FIG. 5. The same parts of the two are not described again. The following mainly describes differences between the two. Each side of the internal patch 1112 of the first AMC structure unit 111 is disposed in parallel with a corresponding side of the external frame-shaped patch 1111, and an included angle is formed between each side of the external frame-shaped patch 1111 and the first direction X. In some embodiments, the included angle is in a range of 0° to 90°.

Figure 18:
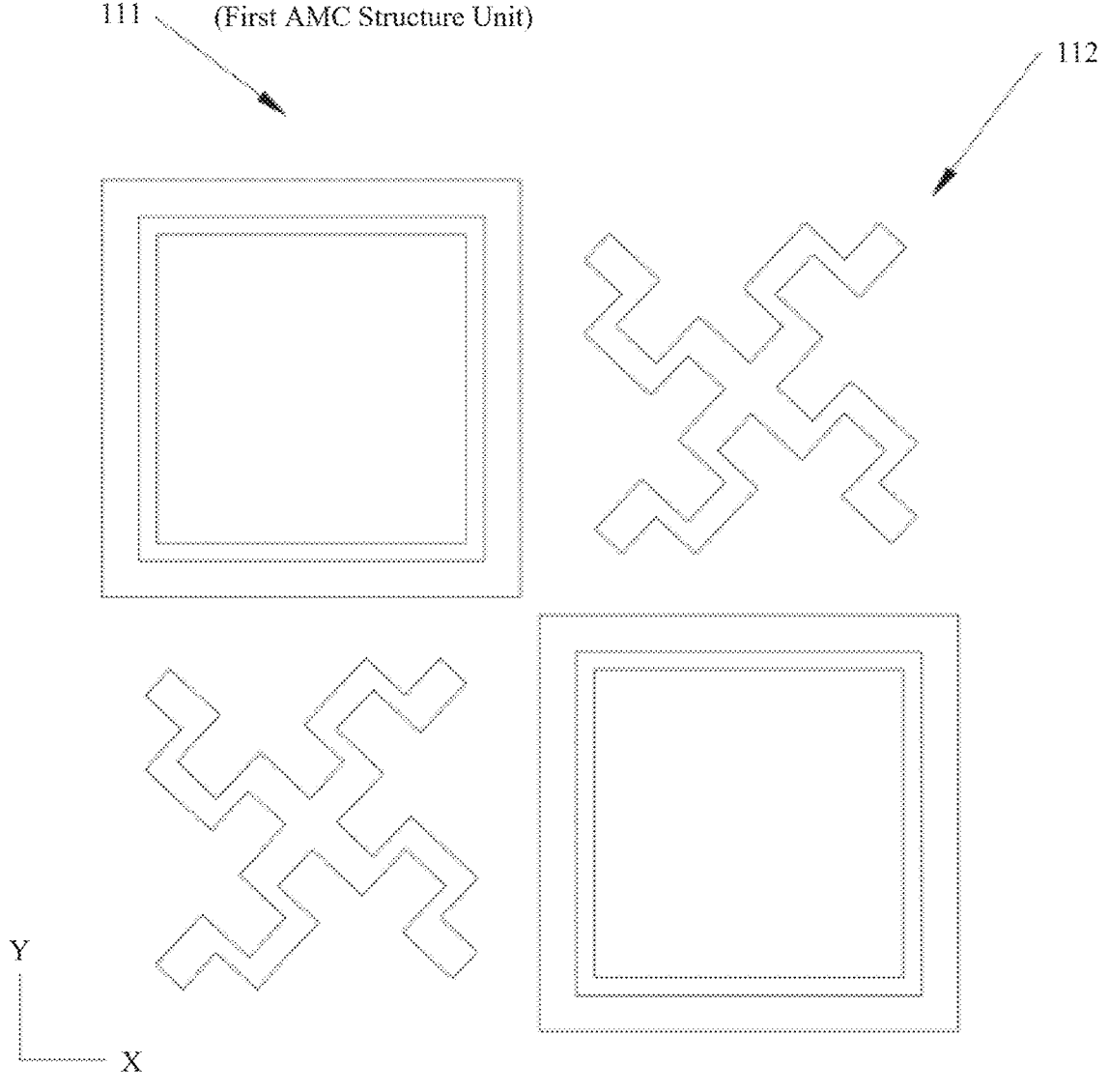
FIG. 18 is a schematic diagram of a structure of a possible arrangement manner of a first AMC structure unit and a second AMC structure unit shown in FIG. 4.

FIG. 18 is a schematic diagram of structure of a possible arrangement manner of the first AMC structure unit 111 and the second AMC structure unit 112 shown in FIG. 4. The multi-frequency AMC structure 11 in this embodiment may include some features of the multi-frequency AMC structure 11 in the embodiment shown in FIG. 5. The same parts of the two are not described again. The following mainly describes the differences between the two. An included angle is formed between an extension direction of the linear patches 1121 and 1122 of the second AMC structure unit 112 and the first direction X. In some embodiments, the included angle is in a range of 0° to 90°.

Figure 19:
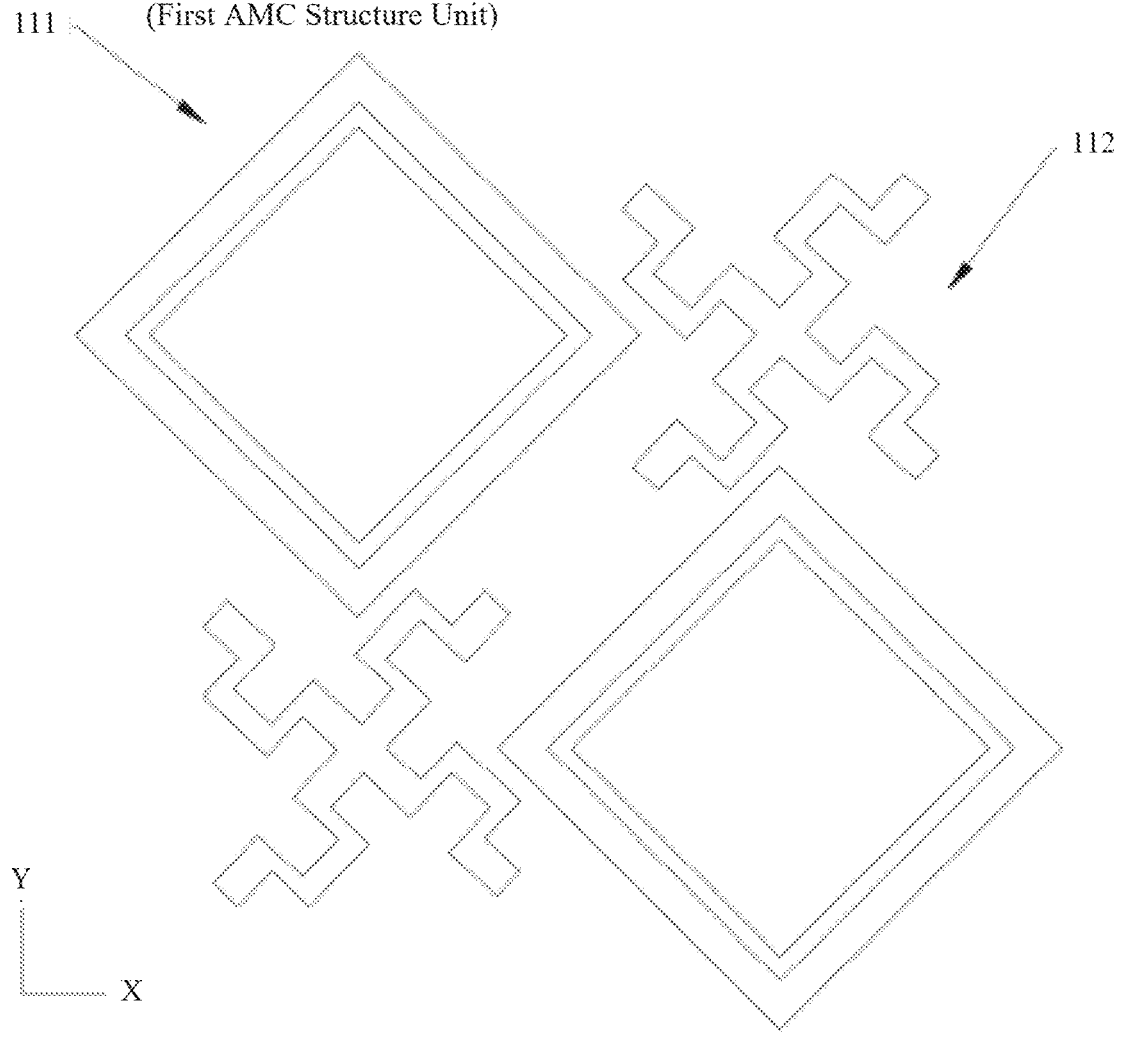
FIG. 19 is a schematic diagram of a structure of a possible arrangement manner of a first AMC structure unit and a second AMC structure unit shown in FIG. 4.

FIG. 19 is a schematic diagram of a structure of a possible arrangement manner of the first AMC structure unit 111 and the second AMC structure unit 112 shown in FIG. 4. The multi-frequency AMC structure 11 in this embodiment may include some features of the multi-frequency AMC structure 11 in the embodiment shown in FIG. 5. The same parts of the two are not described again. The following mainly describes the differences between the two. Each side of the internal patch 1112 of the first AMC structure unit 111 is disposed in parallel to a corresponding side of the external frame-shaped patch 1111, an included angle is disposed between each side of the external frame-shaped patch 1111 and the first direction X, and an included angle is formed between an extension direction of the linear patches 1121 and 1122 of the second AMC structure unit 112 and the first direction X. In some embodiments, the included angle is in a range of 0° to 90°.

Figure 20:
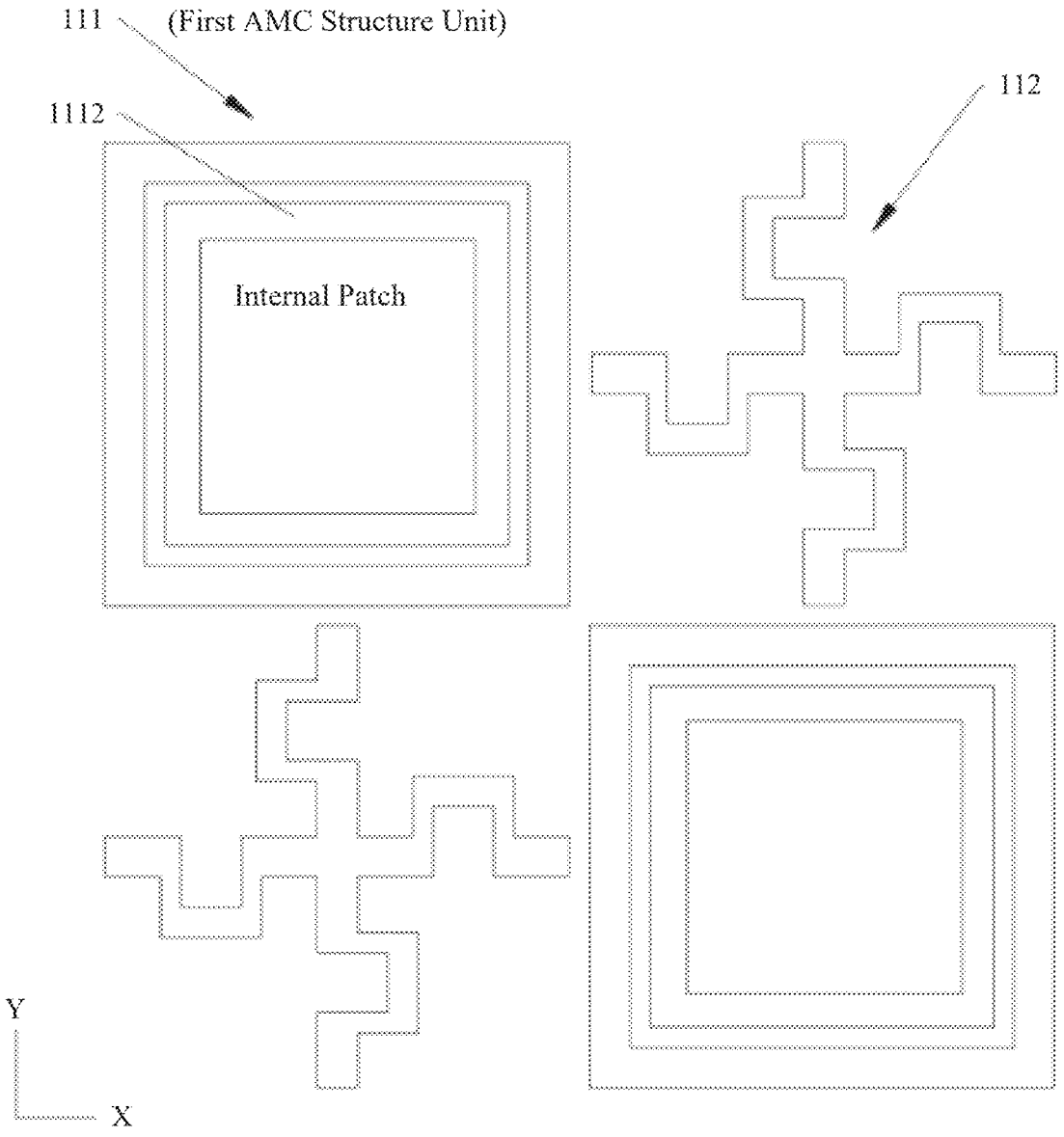
FIG. 20 is a schematic diagram of a structure of another possible implementation of a first AMC structure unit shown in FIG. 4.

FIG. 20 is a schematic diagram of a structure of a possible implementation of the first AMC structure unit 111 shown in FIG. 4. The multi-frequency AMC structure 11 in this embodiment may include some features of the multi-frequency AMC structure 11 in the embodiment shown in FIG. 5. The same parts of the two are not described again. The following mainly describes the differences between the two. The internal patch 1112 of the first AMC structure unit 111 may be a frame-shaped patch.

Figure 21:
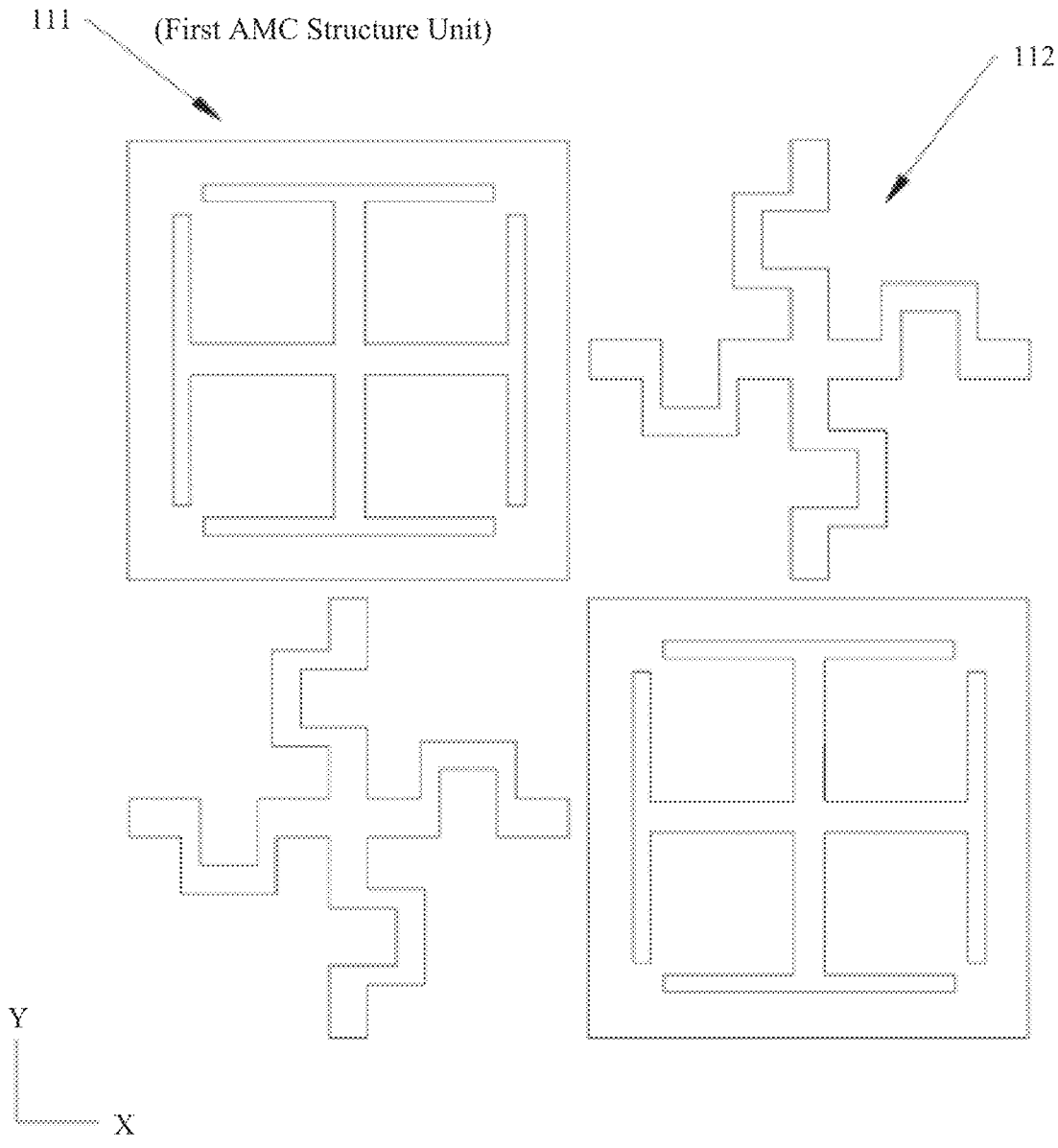
FIG. 21 is a schematic diagram of a structure of still another possible implementation of a first AMC structure unit shown in FIG. 4.

FIG. 21 is a schematic diagram of a structure of a possible implementation of the first AMC structure unit 111 shown in FIG. 4. The multi-frequency AMC structure 11 in this embodiment may include some features of the multi-frequency AMC structure 11 in the embodiment shown in FIG. 4. The same parts of the two are not described again. The following mainly describes the differences between the two. The first AMC structure unit 111 is a square patch, and the square patch has a ✛ shaped gap. A ✛ shaped gap is a centrosymmetric figure. A "cross"-shaped gap in the ✛ shaped gap is a straight edge. In some other embodiments, the "cross"-shaped gap in the ✛ shaped gap may alternatively be a curved edge.

Figure 22:
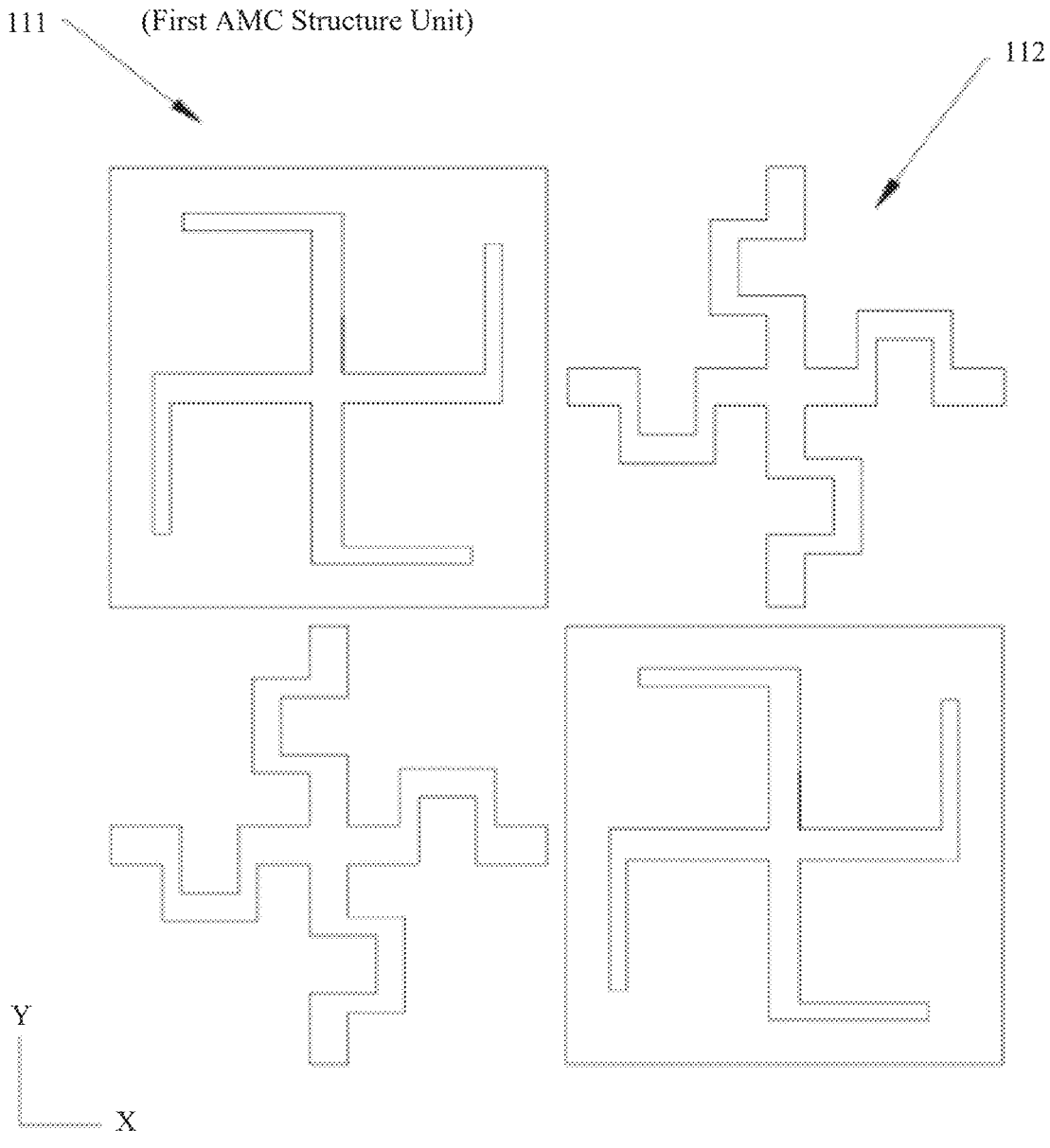
FIG. 22 is a schematic diagram of a structure of yet another possible implementation of a first AMC structure unit shown in FIG. 4.

FIG. 22 is a schematic diagram of a structure of a possible implementation of the first AMC structure unit 111 shown in FIG. 4. The multi-frequency AMC structure 11 in this embodiment may include some features of the multi-frequency AMC structure 11 in the embodiment shown in FIG. 4. The same parts of the two are not described again. The following mainly describes the differences between the two. The first AMC structure unit 111 is a square patch, and the square patch has a gap of a ⊓ shaped structure. In some other embodiments, the first AMC structure unit 111 is a square patch, and the square patch has a gap of an inverted ⊔ shaped structure.

Figure 23:
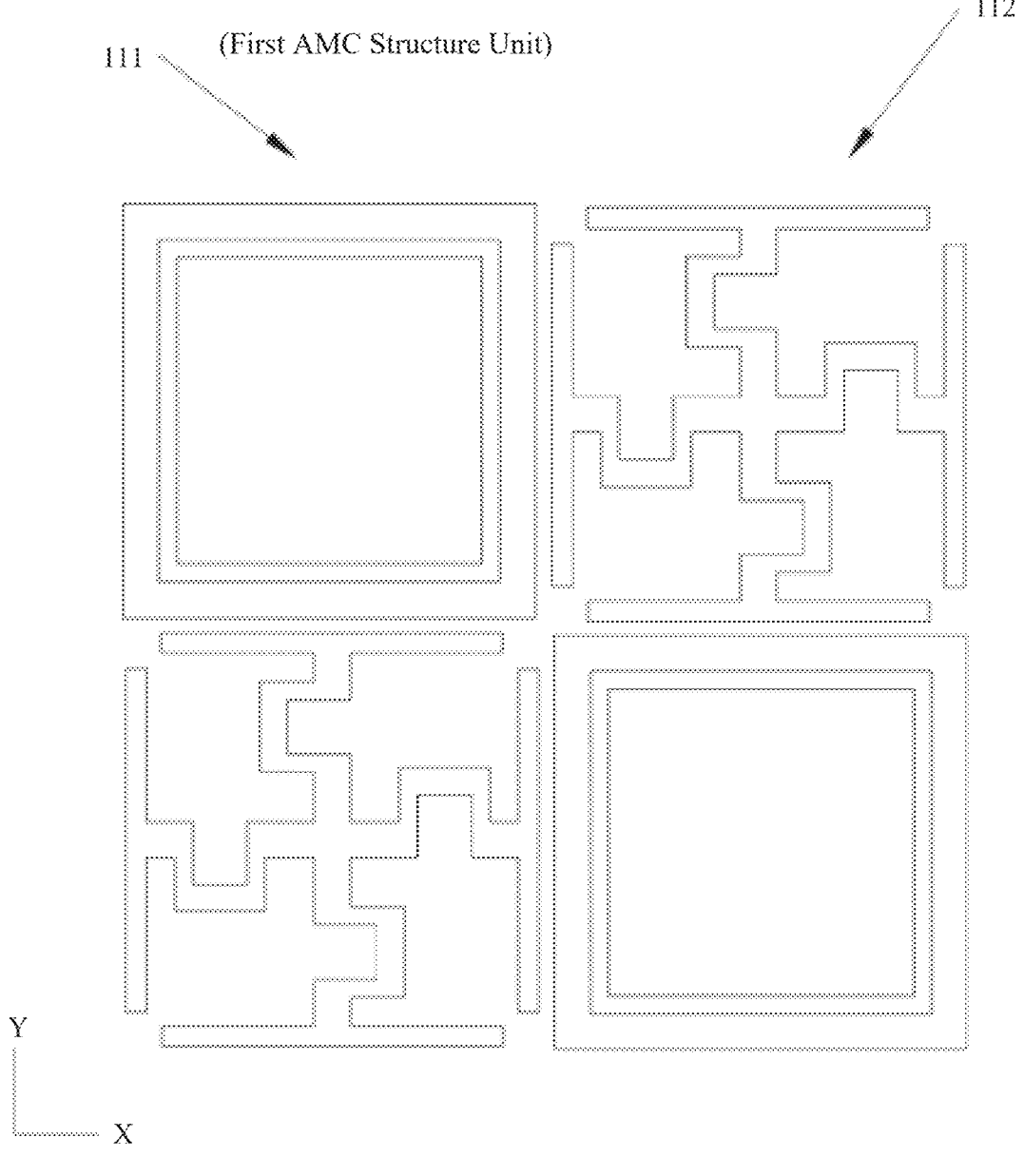
FIG. 23 is a schematic diagram of a structure of another possible implementation of a second AMC structure unit shown in FIG. 4.

FIG. 23 is a schematic diagram of a structure of a possible implementation of the second AMC structure unit 112 shown in FIG. 4. The multi-frequency AMC structure 11 in this embodiment may include some features of the multi-frequency AMC structure 11 in the embodiment shown in FIG. 4. The same parts of the two are not described again.

The following mainly describes the differences between the two. The second AMC structure unit 112 is a ✛ shaped patch. The ✛ shaped patch is a centrosymmetric figure. A "cross"-shaped gap in the ✛ shaped gap is a straight edge. In some other embodiments, the "cross"-shaped gap in the ✛ shaped gap may alternatively be a curved edge.

Figure 24:
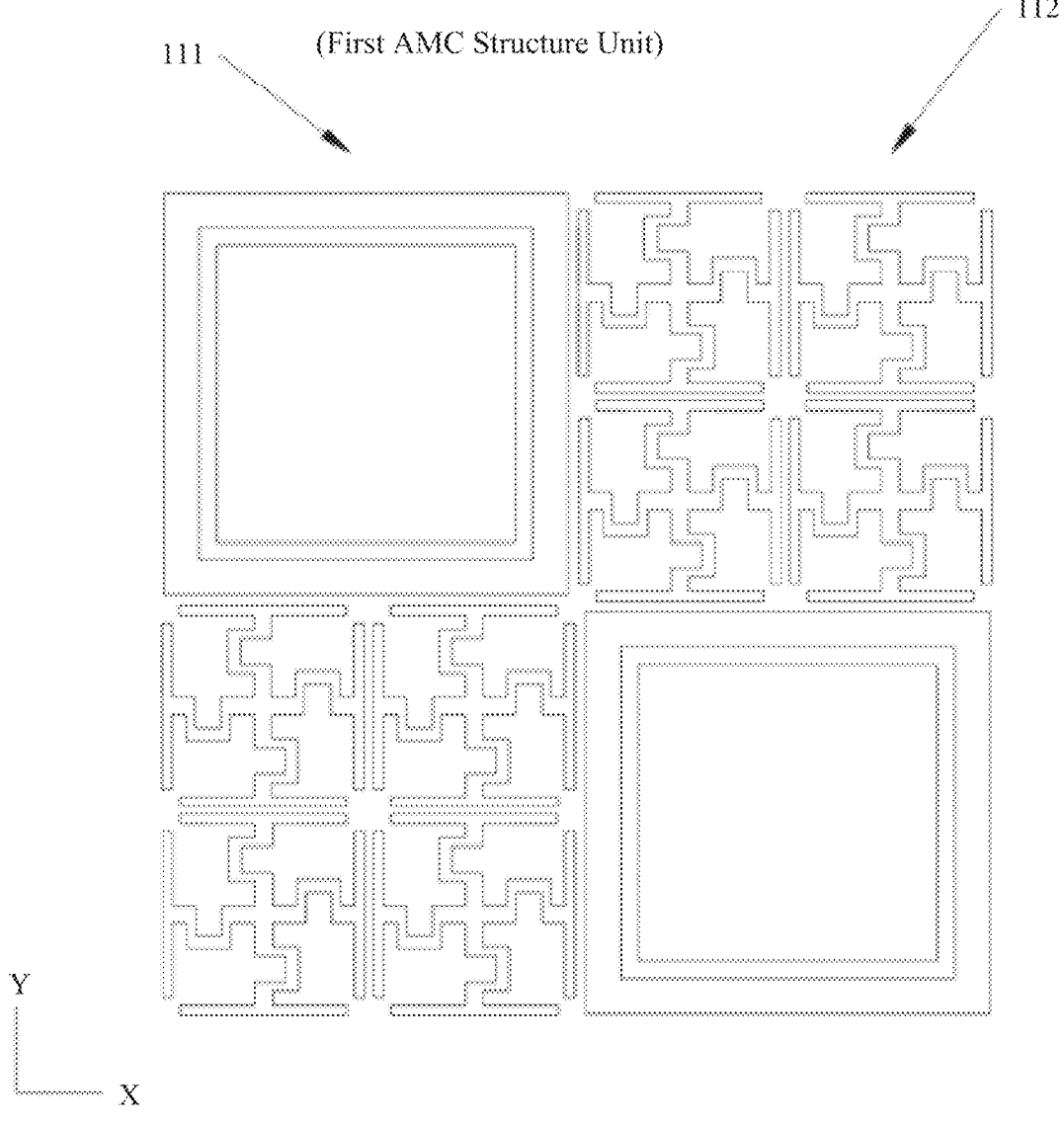
FIG. 24 is a schematic diagram of a structure of still another possible implementation of a second AMC structure unit shown in FIG. 4.

FIG. 24 is a schematic diagram of a structure of a possible implementation of the second AMC structure unit shown in FIG. 4. The multi-frequency AMC structure 11 in this embodiment may include some features of the multi-frequency AMC structure 11 in the embodiment shown in FIG. 4. The same parts of the two are not described again. The following mainly describes the differences between the two. The second AMC structure unit 112 includes a plurality of patches, each patch is of a cross structure, and the plurality of patches are arranged in a centrosymmetric manner. For example, the second AMC structure unit 112 includes four patches, and each patch is in a Jerusalem cross shape. A "cross"-shaped gap in the ✛ shaped gap is a curved edge. In some other embodiments, the "cross"-shaped gap in the ✛ shaped gap may alternatively be a straight edge.

Figure 25:
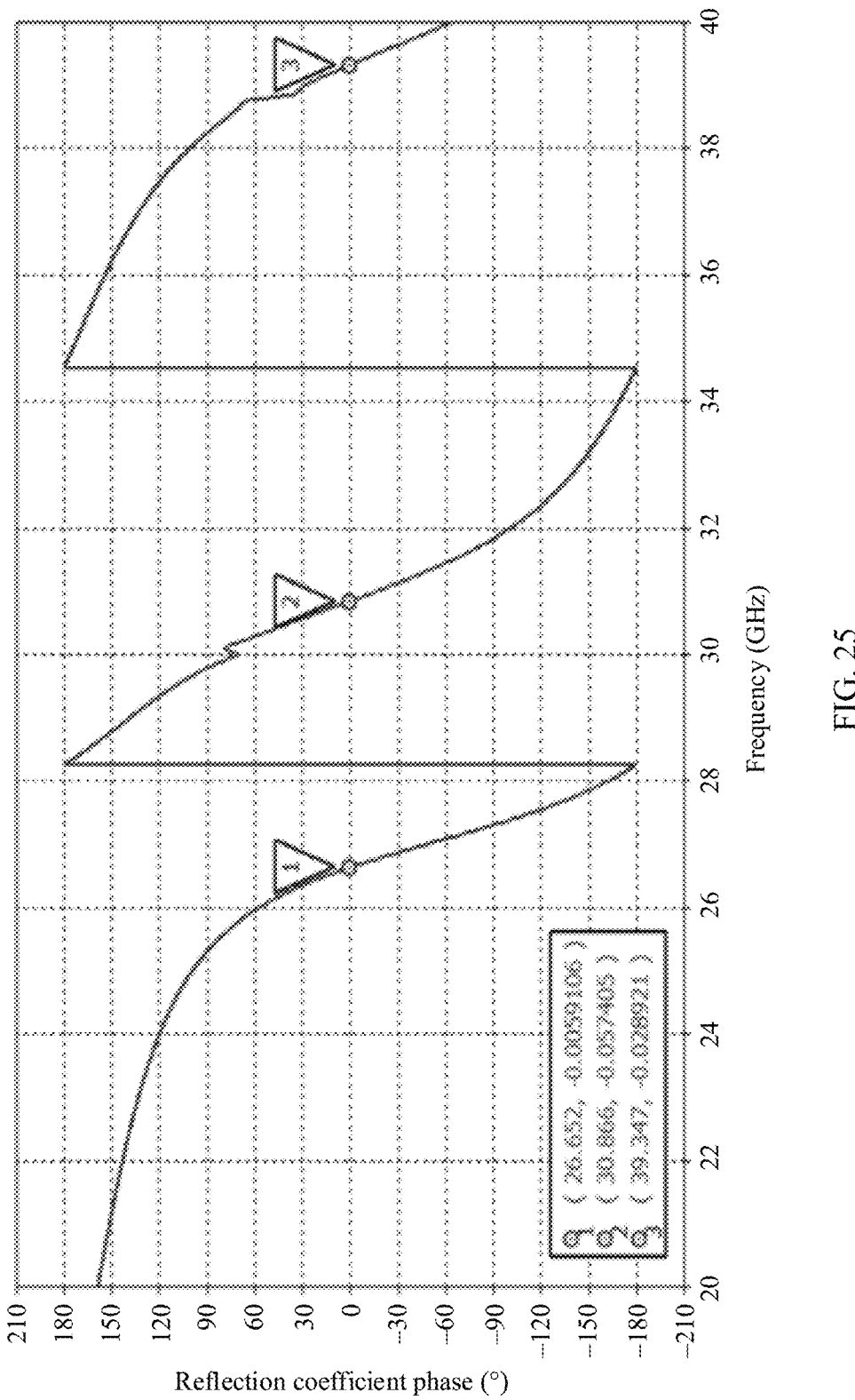
FIG. 25 is a reflection coefficient phase curve of a multi-frequency AMC structure formed by a first AMC structure unit and a second AMC structure unit shown in FIG. 24.

FIG. 25 is a reflection coefficient phase curve of the multi-frequency AMC structure 11 including the first AMC structure unit 111 and the second AMC structure unit 112 shown in FIG. 24. There are three resonance points on the reflection coefficient phase curve, corresponding to resonance frequencies of 26.6 GHz, 30.8 GHz, and 39.3 GHz, respectively. A first resonance frequency of the first AMC structure unit 111 is 26.6 GHz, the first AMC structure unit 111 and the second AMC structure unit 112 are coupled to generate a third resonance frequency 30.8 GHz, and a second resonance frequency of the second AMC structure unit 112 is 39.3 GHz. The multi-frequency AMC structure 11 has three resonance frequencies, and can be used in diversified use scenarios to meet use requirements of a consumer.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Embodiments of this application and features in embodiments may be mutually combined provided that no conflict occurs. Therefore, the protection scope of this application shall be subject to the protection scope of the claims.

What is claimed is:

1. A back cover configured to be applied to a terminal, the back cover comprising:
   a non-metallic plate body; and
   a multi-frequency artificial magnetic conductor (AMC) structure,
   wherein the multi-frequency AMC structure is attached to an inner surface of the non-metallic plate body or is embedded into the non-metallic plate body,
   wherein a middle part of the multi-frequency AMC structure has an opening,
   wherein the multi-frequency AMC structure comprises a plurality of sub-structures,
   wherein each sub-structure of the plurality of sub-structures comprises a first AMC structure having a first resonance frequency and a second AMC structure having a second resonance frequency,
   wherein the first AMC structure and the second AMC structure are located in a same plane parallel to a surface of the AMC structure,
   wherein the first resonance frequency is lower than the second resonance frequency, wherein an antenna of the terminal is configured to be located on an inner side of the back cover, and disposed directly facing the opening of the multi-frequency AMC structure of the back cover,
   wherein the antenna of the terminal is configured to form a projection area on the back cover, and
   wherein the multi-frequency AMC structure and the projection area are respectively provided with a first gap in a direction of a short side of the back cover and a second gap in a direction of a long side of the back cover, and sizes of the first gap and the second gap are in a range of 0 to 0.7 times an equivalent dielectric wavelength corresponding to the first resonance frequency.

2. The back cover according to claim 1, wherein the multi-frequency AMC structure has at least two resonance frequencies, and the at least two resonance frequencies of the multi-frequency AMC structure at least partially overlap with an operating frequency band of the antenna of the terminal.

3. The back cover according to claim 1, wherein:
   the plurality of sub-structures is periodically arranged;
   each sub-structure of the plurality of sub-structures is a centrosymmetric structure; and
   symmetric centers of the plurality of sub-structures are aligned along a first direction and aligned along a second direction perpendicular to the first direction.

4. The back cover according to claim 3, wherein:
   the first AMC structure and the second AMC structure are arranged in a staggered manner; and
   in the first direction and the second direction, a sub-structure adjacent to each of first AMC structure is the second AMC structure, and a sub-structure adjacent to each of second AMC structure is the first AMC structure.

5. The back cover according to claim 3, wherein the first AMC structure comprises an internal patch and an external frame-shaped patch, the external frame-shaped patch is disposed around the internal patch, and a gap exists between the internal patch and the external frame-shaped patch.

6. The back cover according to claim 5, wherein the gap has a width in a range of 0.005 times to 0.04 times a first wavelength, and the first wavelength is an equivalent dielectric wavelength corresponding to the first resonance frequency.

7. The back cover according to claim 5, wherein the internal patch of the first AMC structure is a square patch, and the external frame-shaped patch of the first AMC structure is a frame-shaped patch.

8. The back cover according to claim 7, wherein a side size of the external frame-shaped patch is in a range of 0.15 times to 0.4 times the equivalent dielectric wavelength corresponding to the first resonance frequency, and a side size of the internal patch is in a range of 0.1 times to 0.3 times the equivalent dielectric wavelength corresponding to the first resonance frequency.

9. The back cover according to claim 5, wherein the second AMC structure comprises a first linear patch and a second linear patch, and the first linear patch and the second linear patch are arranged in a cross manner and are perpendicular to each other.

10. The back cover according to claim 9, wherein the first linear patch has a straight line shape, and the second linear patch has a straight line shape.

11. The back cover according to claim 9, wherein the first linear patch comprises one or more protrusions, and the second linear patch comprises one or more protrusions.

12. The back cover according to claim 9, wherein actual lengths of the first linear patch and the second linear patch are in a range of 0.3 times to 1 times the equivalent dielectric wavelength corresponding to the first resonance frequency.

13. The back cover according to claim 3, wherein:

the first AMC structure comprises a first internal patch and a first external frame-shaped patch;

the first external frame-shaped patch is disposed around the first internal patch;

a third gap exists between the first internal patch and the first external frame-shaped patch;

the second AMC structure comprises a second internal patch and a second external frame-shaped patch;

the second external frame-shaped patch is disposed around the second internal patch; a fourth gap exists between the second internal patch and the second external frame-shaped patch; and a width of the third gap is less than a width of the fourth gap.

14. The back cover according to claim 3, wherein:

the first AMC structure comprises an internal patch and an external frame-shaped patch;

the external frame-shaped patch is disposed around the internal patch;

a third gap exists between the internal patch and the external frame-shaped patch;

each side of the internal patch is disposed in parallel with a corresponding side of the external frame-shaped patch;

an included angle is formed between each side of the internal patch and the first direction; and the included angle is in a range of 0° to 90°.

15. The back cover according to claim 3, wherein:

the second AMC structure comprises a first linear patch and a second linear patch;

the first linear patch and the second linear patch are arranged in a cross manner and perpendicular to each other;

an included angle is formed between an extension direction of the first linear patch and the first direction; and the included angle is in a range of 0° to 90°.

16. The back cover according to claim 1, wherein a dielectric constant of the non-metallic plate body is in a range of 2 to 10, a dielectric loss parameter of the non-metallic plate body is less than 0.03, and a thickness of the non-metallic plate body is in a range of 0.3 mm to 1.4 mm.

17. A terminal, comprising:

an antenna; and a back cover;

wherein the back cover comprises a non-metallic plate body and a multi-frequency artificial magnetic conductor (AMC) structure, wherein the multi-frequency AMC structure is attached to an inner surface of the non-metallic plate body or is embedded into the non-metallic plate body, wherein a middle part of the multi-frequency AMC structure has an opening, wherein the multi-frequency AMC structure comprises a plurality of sub-structures, wherein each sub-structure of the plurality of sub-structures comprises a first AMC structure having a first resonance frequency and a second AMC structure having a second resonance frequency,

26 wherein the first AMC structure and the second AMC structure are located in a same plane parallel to a surface of the AMC structure, wherein the first resonance frequency is lower than the second resonance frequency, wherein the antenna is located on an inner side of the back cover, and is disposed directly facing the opening of the multi-frequency AMC structure of the back cover, wherein the antenna is configured for millimeter-wave band operation, wherein the antenna forms a projection area on the back cover, and wherein the multi-frequency AMC structure and the projection area are respectively provided with a first gap in a direction of a short side of the back cover and a second gap in a direction of a long side of the back cover, and sizes of the first gap and the second gap are in a range of 0 to 0.7 times an equivalent dielectric wavelength corresponding to the first resonance frequency.

18. The terminal according to claim 17, wherein a distance between the non-metallic plate body and the antenna, in a direction perpendicular to the back cover, is in a range of 0.2 mm to 1 mm.

19. The terminal according to claim 17, wherein the terminal further comprises a ground component located on the inner side of the back cover, and the antenna is located between the ground component and the back cover.

20. A method for operating a terminal comprising an antenna; and a back cover;

wherein the back cover comprises a non-metallic plate body and a multi-frequency artificial magnetic conductor (AMC) structure, wherein the multi-frequency AMC structure is attached to an inner surface of the non-metallic plate body or is embedded into the non-metallic plate body, wherein a middle part of the multi-frequency AMC structure has an opening, wherein the multi-frequency AMC structure comprises a plurality of sub-structures, wherein each sub-structure of the plurality of sub-structures comprises a first AMC structure having a first resonance frequency and a second AMC structure having a second resonance frequency, wherein the first AMC structure and the second AMC structure are located in a same plane parallel to a surface of the AMC structure, wherein the first resonance frequency is lower than the second resonance frequency, wherein the antenna is located on an inner side of the back cover, and is disposed directly facing the opening of the multi-frequency AMC structure of the back cover, wherein the antenna is configured for millimeter-wave band operation, wherein the antenna forms a projection area on the back cover, and wherein the multi-frequency AMC structure and the projection area are respectively provided with a first gap in a direction of a short side of the back cover and a second gap in a direction of a long side of the back cover, and sizes of the first gap and the second gap are in a range of 0 to 0.7 times an equivalent dielectric wavelength corresponding to the first resonance frequency, the method comprising:

receiving a millimeter-wave band radio signal using the antenna.

* * * * *